(12) United States Patent
Chuey

(10) Patent No.: US 7,039,397 B2
(45) Date of Patent: May 2, 2006

(54) USER-ASSISTED PROGRAMMABLE APPLIANCE CONTROL

(75) Inventor: Mark D. Chuey, Northville, MI (US)

(73) Assignee: Lear Corporation, Southfield, MI (US)

( * ) Notice: Subject to any disclaimer, the term of this patent is extended or adjusted under 35 U.S.C. 154(b) by 151 days.

(21) Appl. No.: 10/630,390

(22) Filed: Jul. 30, 2003

(65) Prior Publication Data

US 2005/0026601 A1    Feb. 3, 2005

(51) Int. Cl.
*H04M 3/00* (2006.01)
*G05B 19/00* (2006.01)
*G05Q 9/00* (2006.01)

(52) U.S. Cl. .................... 455/418; 340/5.64; 340/5.23; 380/262

(58) Field of Classification Search ............... 455/419, 455/418, 325; 340/825.69, 5.64, 5.22, 5.23, 340/5.26, 5.28; 345/48; 380/270; 713/200
See application file for complete search history.

(56) References Cited

U.S. PATENT DOCUMENTS

| | | |
|---|---|---|
| 1,522,241 A | 1/1925 | Hennessey |
| 3,098,212 A | 7/1963 | Creamer, Jr. |
| 3,300,867 A | 1/1967 | Sampson |
| 3,337,992 A | 8/1967 | Tolson |
| 3,456,387 A | 7/1969 | Tolson |
| 3,680,951 A | 8/1972 | Jordan et al. |
| 4,074,200 A | 2/1978 | Buchta |
| 4,167,833 A | 9/1979 | Farina et al. |
| 4,241,870 A | 12/1980 | Marcus |
| 4,247,850 A | 1/1981 | Marcus |
| 4,425,717 A | 1/1984 | Marcus |
| 4,447,808 A | 5/1984 | Marcus |
| 4,453,161 A | 6/1984 | Lemelson |
| 4,535,333 A | 8/1985 | Twardowski |
| 4,581,827 A | 4/1986 | Higashi |
| 4,595,228 A | 6/1986 | Chu |
| 4,598,287 A | 7/1986 | Osakabe et al. |
| 4,623,887 A | 11/1986 | Welles, II |
| 4,631,708 A | 12/1986 | Wood et al. |
| 4,635,033 A | 1/1987 | Inukai et al. |
| 4,638,433 A | 1/1987 | Schindler |
| 4,676,601 A | 6/1987 | Itoh et al. |

(Continued)

FOREIGN PATENT DOCUMENTS

GB    2 182 790 A    10/1986

(Continued)

OTHER PUBLICATIONS

Garage Door/Gate Remote Control User's Instructions (Model 39), Skylink Technologies Inc., 2002.

(Continued)

*Primary Examiner*—Stephen D'Agosta
*Assistant Examiner*—Kiet Daon
(74) *Attorney, Agent, or Firm*—Brooks Kushman P.C.

(57) ABSTRACT

A universal remote control interacts with a user to assist in training to one or more appliances. If the appliance is activated by a rolling code activation signal, a sequence of different rolling code activation signals is transmitted until the user indicates a successful rolling code transmission. If the appliance is activated by a fixed code activation signal, a fixed code word is used to generate and transmit each of a sequence of different fixed code activation signals until the user indicates a successful fixed code transmission. In response to an activation input, an activation signal is generated and transmitted based on data stored following user indication of a successful transmission.

22 Claims, 16 Drawing Sheets

U.S. PATENT DOCUMENTS

| | | |
|---|---|---|
| 4,707,788 A | 11/1987 | Tashiro et al. |
| RE32,576 E | 1/1988 | Pastore |
| 4,727,302 A | 2/1988 | Mizuta et al. |
| 4,743,905 A | 5/1988 | Wiegand |
| 4,747,159 A | 5/1988 | Kato |
| 4,750,118 A | 6/1988 | Heitschel et al. |
| 4,754,255 A | 6/1988 | Sanders et al. |
| 4,771,283 A | 9/1988 | Imoto |
| 4,793,690 A | 12/1988 | Gahan et al. |
| 4,825,200 A | 4/1989 | Evans et al. |
| 4,881,148 A | 11/1989 | Lambropoulos et al. |
| 4,882,565 A | 11/1989 | Gallmeyer |
| 4,886,960 A | 12/1989 | Molyneux et al. |
| 4,890,108 A | 12/1989 | Drori et al. |
| 4,896,030 A | 1/1990 | Miyaji |
| 4,905,279 A | 2/1990 | Nishio |
| 4,917,477 A | 4/1990 | Bechtel et al. |
| 4,953,305 A | 9/1990 | Van Lente et al. |
| 4,978,944 A | 12/1990 | Andros et al. |
| 4,988,992 A | 1/1991 | Heitschel et al. |
| 5,016,996 A | 5/1991 | Ueno |
| 5,064,274 A | 11/1991 | Alten |
| 5,103,221 A | 4/1992 | Memmola |
| 5,109,222 A | 4/1992 | Welty |
| 5,113,821 A | 5/1992 | Fukui et al. |
| 5,122,647 A | 6/1992 | Lynam et al. |
| 5,123,008 A | 6/1992 | Beesley |
| 5,126,686 A | 6/1992 | Tam |
| 5,146,215 A | 9/1992 | Drori |
| 5,154,617 A | 10/1992 | Suman et al. |
| 5,181,423 A | 1/1993 | Philipps et al. |
| 5,191,610 A | 3/1993 | Hill et al. |
| 5,201,067 A | 4/1993 | Grube et al. |
| 5,225,847 A | 7/1993 | Roberts et al. |
| 5,243,322 A | 9/1993 | Thompson et al. |
| 5,252,960 A | 10/1993 | Duhame |
| 5,252,977 A | 10/1993 | Lueker et al. |
| 5,266,945 A | 11/1993 | Peek et al. |
| 5,278,547 A | 1/1994 | Suman et al. |
| 5,369,706 A | 11/1994 | Latka |
| 5,379,453 A | 1/1995 | Tigwell |
| 5,402,105 A | 3/1995 | Doyle et al. |
| 5,408,698 A | 4/1995 | Serizawa et al. |
| 5,420,925 A | 5/1995 | Michaels |
| 5,442,340 A | 8/1995 | Dykema |
| 5,455,716 A | 10/1995 | Suman et al. |
| 5,463,374 A | 10/1995 | Mendez et al. |
| 5,471,668 A | 11/1995 | Soenen et al. |
| 5,475,366 A | 12/1995 | Van Lente et al. |
| 5,479,155 A | 12/1995 | Zeinstra et al. |
| 5,517,187 A | 5/1996 | Bruwer et al. |
| RE35,364 E | 10/1996 | Heitschel et al. |
| 5,564,101 A | 10/1996 | Eisfeld et al. |
| 5,583,485 A | 12/1996 | Van Lente et al. |
| 5,594,429 A | 1/1997 | Nakahara |
| 5,596,316 A | 1/1997 | Honeck |
| 5,598,475 A | 1/1997 | Soenen et al. |
| 5,613,732 A | 3/1997 | Demick |
| 5,614,885 A | 3/1997 | Van Lente et al. |
| 5,614,891 A | 3/1997 | Zeinstra et al. |
| 5,619,190 A | 4/1997 | Duckworth et al. |
| 5,627,529 A | 5/1997 | Duckworth et al. |
| 5,645,308 A | 7/1997 | Fink |
| 5,646,701 A | 7/1997 | Duckworth et al. |
| 5,661,455 A | 8/1997 | Van Lente et al. |
| 5,661,651 A | 8/1997 | Geschke et al. |
| 5,661,804 A | 8/1997 | Dykema et al. |
| 5,680,131 A | 10/1997 | Utz |
| 5,680,134 A | 10/1997 | Tsui |
| 5,686,903 A | 11/1997 | Duckworth et al. |
| 5,686,904 A | 11/1997 | Bruwer |
| 5,691,848 A | 11/1997 | Van Lente et al. |
| 5,699,044 A | 12/1997 | Van Lente et al. |
| 5,699,054 A | 12/1997 | Duckworth |
| 5,699,055 A | 12/1997 | Dykema et al. |
| 5,708,415 A | 1/1998 | Van Lente et al. |
| 5,715,020 A | 2/1998 | Kuroiwa et al. |
| 5,731,756 A | 3/1998 | Roddy |
| 5,751,224 A | 5/1998 | Fitzgibbon |
| 5,793,300 A | 8/1998 | Suman et al. |
| 5,812,097 A | 9/1998 | Maldonado |
| 5,838,255 A | 11/1998 | Di Croce |
| 5,841,253 A | 11/1998 | Fitzgibbon et al. |
| 5,841,390 A | 11/1998 | Tsui |
| 5,841,813 A | 11/1998 | Van Nee |
| 5,845,593 A | 12/1998 | Birkestrand |
| 5,854,593 A | 12/1998 | Dykema et al. |
| 5,872,513 A * | 2/1999 | Fitzgibbon et al. ........ 340/5.28 |
| 5,903,226 A | 5/1999 | Suman et al. |
| 5,926,087 A | 7/1999 | Busch et al. |
| 5,926,106 A | 7/1999 | Beran et al. |
| 5,940,000 A | 8/1999 | Dykema |
| 5,940,120 A | 8/1999 | Frankhouse et al. |
| 5,949,349 A * | 9/1999 | Farris et al. ............... 340/5.26 |
| 6,002,332 A | 12/1999 | King |
| 6,005,508 A | 12/1999 | Tsui |
| 6,021,319 A | 2/2000 | Tigwell |
| 6,025,785 A * | 2/2000 | Farris et al. ............... 340/5.23 |
| 6,049,289 A | 4/2000 | Waggamon et al. |
| 6,055,508 A | 4/2000 | Naor et al. |
| RE36,703 E | 5/2000 | Heitschel et al. |
| 6,072,436 A | 6/2000 | Marougi |
| 6,078,271 A | 6/2000 | Roddy et al. |
| 6,081,203 A | 6/2000 | Fitzgibbon |
| 6,091,343 A | 7/2000 | Dykema et al. |
| 6,127,740 A | 10/2000 | Roddy et al. |
| 6,130,625 A | 10/2000 | Harvey |
| 6,131,019 A | 10/2000 | King |
| 6,137,421 A | 10/2000 | Dykema |
| 6,154,544 A * | 11/2000 | Farris et al. ................ 380/262 |
| 6,166,650 A | 12/2000 | Bruwer |
| 6,175,312 B1 | 1/2001 | Bruwer et al. |
| 6,181,255 B1 * | 1/2001 | Crimmins et al. ..... 340/825.69 |
| 6,191,701 B1 | 2/2001 | Bruwer |
| 6,243,000 B1 | 6/2001 | Tsui |
| 6,249,673 B1 | 6/2001 | Tsui |
| 6,271,765 B1 | 8/2001 | King et al. |
| 6,308,083 B1 | 10/2001 | King |
| 6,320,514 B1 | 11/2001 | Flick |
| 6,333,698 B1 | 12/2001 | Roddy |
| 6,359,558 B1 | 3/2002 | Tsui |
| 6,362,771 B1 | 3/2002 | Schofield et al. |
| 6,414,587 B1 | 7/2002 | Fitzgibbon |
| 6,441,719 B1 | 8/2002 | Tsui |
| 6,486,795 B1 | 11/2002 | Sobel et al. |
| RE37,986 E | 2/2003 | Heitschel et al. |
| 6,525,645 B1 | 2/2003 | King et al. |
| 6,556,681 B1 | 4/2003 | King |
| 6,556,813 B1 | 4/2003 | Tsui |
| 6,559,775 B1 | 5/2003 | King |
| 6,634,408 B1 | 10/2003 | Mays |
| 6,690,796 B1 * | 2/2004 | Farris et al. ................ 380/239 |
| 6,703,941 B1 | 3/2004 | Blaker |
| 6,956,460 B1 * | 10/2005 | Tsui .......................... 340/5.26 |
| 2002/0034303 A1 | 3/2002 | Farris et al. |
| 2002/0067826 A1 | 6/2002 | King |
| 2002/0075133 A1 * | 6/2002 | Flick ......................... 340/5.64 |
| 2002/0126037 A1 | 9/2002 | Fitzgibbon |
| 2002/0137479 A1 | 9/2002 | Tsui |
| 2002/0140569 A1 | 10/2002 | van Ee et al. |
| 2002/0163440 A1 * | 11/2002 | Tsui ..................... 340/825.69 |
| 2002/0190872 A1 | 12/2002 | Suman et al. |
| 2002/0191794 A1 | 12/2002 | Farris et al. |
| 2002/0197955 A1 | 12/2002 | Witkowski et al. |

| | | | |
|---|---|---|---|
| 2003/0016119 A1* | 1/2003 | Teich | 340/5.22 |
| 2003/0016139 A1 | 1/2003 | Teich | |
| 2003/0033540 A1* | 2/2003 | Fitzgibbon | 713/200 |
| 2003/0067394 A1 | 4/2003 | Tsui | |
| 2003/0076235 A1 | 4/2003 | Tsui | |
| 2003/0118187 A1* | 6/2003 | Fitzgibbon | 380/270 |
| 2003/0189530 A1* | 10/2003 | Tsui | 345/48 |
| 2003/0197594 A1 | 10/2003 | Olson et al. | |
| 2003/0197595 A1 | 10/2003 | Olson et al. | |
| 2003/0216139 A1* | 11/2003 | Olson et al. | 455/419 |
| 2003/0228879 A1 | 12/2003 | Witkowski et al. | |
| 2005/0024184 A1 | 2/2005 | Chuey | |
| 2005/0024185 A1 | 2/2005 | Chuey | |
| 2005/0024229 A1 | 2/2005 | Chuey | |
| 2005/0024230 A1 | 2/2005 | Chuey | |
| 2005/0024254 A1 | 2/2005 | Chuey | |
| 2005/0024255 A1 | 2/2005 | Chuey | |
| 2005/0026601 A1 | 2/2005 | Chuey | |
| 2005/0026602 A1 | 2/2005 | Chuey et al. | |
| 2005/0026605 A1 | 2/2005 | Guthrie et al. | |

FOREIGN PATENT DOCUMENTS

| | | |
|---|---|---|
| GB | 2 302 751 A | 6/1996 |
| GB | 2 336 433 | 4/1999 |
| GB | 2335773 A | 9/1999 |
| GB | 2 366 433 A1 | 5/2000 |
| WO | WO 94/02920 | 7/1993 |
| WO | WO 00/29699 | 5/2000 |

OTHER PUBLICATIONS

HomeLink Wireless Control System Lighting Kit Installation, http://www.homelink.com/print/lighting_print.html.

HomeLink Wireless Control System Frequently Asked Questions, http://www.homelink.com/print/faq_print.html.

HomeLink Universal 2 Channel Receiver Model PR433-2, Installation Instructions, 114A2437, 2000.

Getting Started with HomeLink, Programming Garage Door Openers and Gates.

HomeLink Universal Transceiver Lighting Package Programming.

Microchip HCS360 Keeloq Code Hopping Encoder, Microchip Technology Inc., DS40152E, 2002.

Microchip TB003, An Introduction to Keeloq Code Hopping, Microchip Technology Inc., DS91002A, 1996.

Chamberlain LiftMaster Professional Universal Receiver Model 635LM Owner's Manual, 114A2128C, The Chamberlain Group, Inc., 2002.

Flash2Pass eliminates past garage door opener hassles using a secure and easy-to-install system, Press Release, F2P Electronics, Inc., Jan. 2002.

Flash2Pass Easy Set Up Instructions, v031003, F2P Technologies.

The X-10 Powerhouse Power Line Interface Model #PL513 and Two-Way Power Line Interface Model #TW523, Technical Note, Dave Rye, Rev. 2.4, PL/TWTN/1291.

Neural Networks for ECCM, Simon Haykin, McMaster University Communications Research Laboratory Technical Report 282, Neurocomputing for Signal Processing, Feb. 1994, http://www.crl.mcmaster.ca/cgi-bin/makerabs.pl?282.

DRFM Theory of Operation, KOR Electronics, Inc., http://www.korelectronics.com/product_sheets/theory-of-operations/drfm-theoryofop.htm.

Fabrication Process Combines Low Cost and High Reliability, Murat Eron, Richard J. Perko and R. James Gibson, Microwaves & RF, Oct. 1993.

Pager and Garage Door Opener Combination, Gail Marino, Motorola Technical Developments, vol. 10, Mar. 1990.

Search and Examination Report Under Sections 17 and 18(3), Sep. 25, 2003.

Combined Search and Examination Report Under Sections 17 and 18(3) mailed Nov. 30, 2004 for the corresponding European patent application GB 0415908.3.

Combined Search and Examination Report Under Sections 17 and 18(3) for European Application No. GB0416742.5 dated Oct. 26, 2004.

Combined Search and Examination Report Under 37 Sections 17 and 18(3) mailed Nov. 2, 2004 for European patent application GB 0416753.2.

Combined Search and Examination Report Under Sections 17 and 18(3) mailed Nov. 2, 2004 for European patent application GB 0416789.6.

German Search/Examination Document, German Patent Application No. 103 14 228.2, Dec. 14, 2004.

* cited by examiner

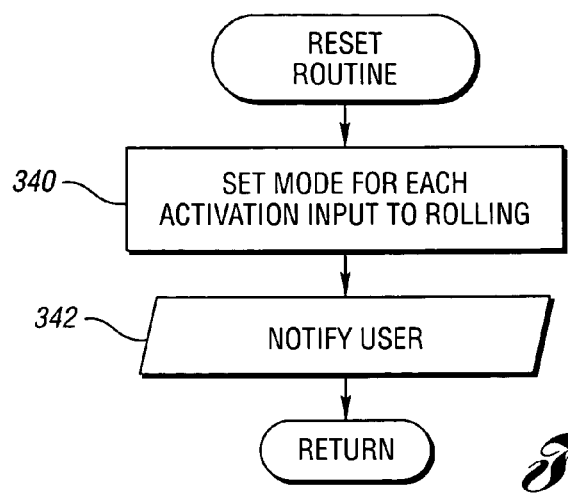
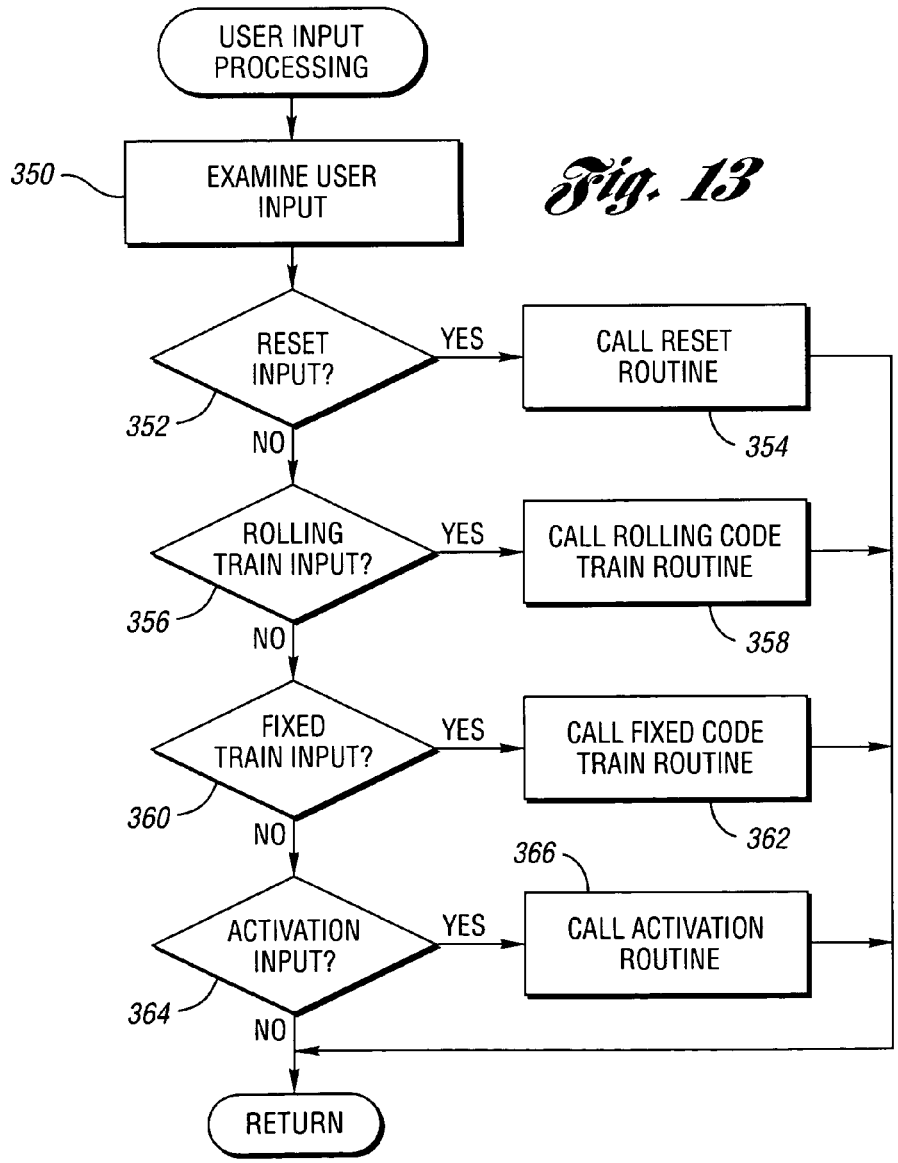

USER-ASSISTED PROGRAMMABLE APPLIANCE CONTROL

BACKGROUND OF THE INVENTION

1. Field of the Invention

The present invention relates to wireless remote control of appliances such as, for example, garage door openers.

2. Background Art

Home appliances, such as garage door openers, security gates, home alarms, lighting, and the like, may conveniently be operated from a remote control. Typically, the remote control is purchased together with the appliance. The remote control transmits a radio frequency activation signal which is recognized by a receiver associated with the appliance. Aftermarket remote controls are gaining in popularity as such devices can offer functionality different from the original equipment's remote control. Such functionality includes decreased size, multiple appliance interoperability, increased performance, and the like. Aftermarket controllers are also purchased to replace lost or damaged controllers or to simply provide another remote control for accessing the appliance.

An example application for aftermarket remote controls are remote garage door openers integrated into an automotive vehicle. These integrated remote controls provide customer convenience, appliance interoperability, increased safety, and enhanced vehicle value. Present in-vehicle integrated remote controls provide a "universal" or programmable garage door opener which learns characteristics of an activation signal received from an existing transmitter then, when prompted by a user, generates a single activation signal having the same characteristics. One problem with such devices is the difficulty experienced by users in programming these devices. This is particularly true for rolling code receivers where the user must program both the in-vehicle remote control and the appliance receiver.

What is needed is a universal remote control that is easier to program. This remote control should be integrateable into an automotive vehicle using simple electronic circuits.

SUMMARY OF THE INVENTION

The present invention provides a universal remote control that interacts with the user to assist in training to a particular remotely controlled appliance.

A system for wirelessly activating an appliance responding to one of a plurality of transmission schemes is provided. The system includes at least one user activation input and a user programming input. Memory holds data describing a plurality of rolling code transmission schemes and a plurality of fixed code transmission schemes. A transmitter transmits a radio frequency activation signal based on any of the plurality of transmission schemes. Control logic implements a rolling code programming mode, a fixed code programming mode and an operating mode. In rolling code programming mode, a sequence of rolling code activation signals is generated and transmitted. Each rolling code activation signal is based on a different rolling code transmission scheme. The sequence is transmitted until user input indicates a successful rolling code transmission scheme. The control logic stores data specifying the successful rolling code transmission scheme associated with one of the activation inputs. In fixed code programming mode, a fixed code is received from the user programming input. A sequence of fixed code activation signals is generated and transmitted. Each fixed code activation signal is based on a fixed code transmission scheme and the received fixed code. The sequence of fixed codes is transmitted until user input indicates a successful fixed code transmission scheme. The fixed code and data specifying the successful transmission scheme are stored associated with one of the activation inputs. In operating mode, an activation input is received. Data associated with the received activation input is retrieved and used to generate an activation signal.

In an embodiment of the present invention, the system includes a plurality of activation inputs. Each of these activation inputs may include a switch, allowing the user programming input to be the same as the activation inputs.

The fixed code may be parallelly received, such as by setting DIP switches, or may be serially received, such as through a sequence of button depressions, as data transmitted over a serial bus, and the like.

In another embodiment of the present invention, the control logic pauses for user input after transmission of at least one fixed code activation signal in the sequence of fixed code activation signals. Similarly, the control logic may pause for user input after transmission of at least one rolling code activation signal in the sequence of rolling code activation signals.

In still another embodiment of the present invention, the sequence of fixed code signals can include at least one pair of fixed code activation signals based on the same fixed code transmission scheme. One fixed code activation signal in each pair may be based on a reversal of the fixed code. Alternatively, or in addition, one fixed code activation signal in each pair may be based on an inverse of the fixed code. A transmission based on both an inversion and a reversal is also possible.

In yet another embodiment of the present invention, the system includes a data port for receiving data describing the transmission schemes. One or more of various types of data ports are possible, including telephone interfaces; short-range links to wireless appliances such as laptop computers, telephones, and personal digital assistants; data connections for serial or parallel data transfer; and the like.

In a further embodiment of the present invention, a vehicle bus provides a communication path for the control logic. This path permits remote programming and/or activation. In additions, data describing the transmission schemes may be loaded into memory over the vehicle bus.

A method of activating an appliance is provided. If a user indicates that the appliance is activated by a rolling code activation signal, a sequence of different rolling code activation signals is transmitted until the user indicates a successful rolling code transmission. Data is then stored representing a rolling code scheme used to generate the successful rolling code transmission. If the user indicates that the appliance is activated by a fixed code activation signal, a fixed code word is used to generate and transmit each of a sequence of different fixed code activation signals until the user indicates a successful fixed code transmission. Data representing the fixed code word and a fixed code scheme used to generate the successful fixed code transmission is then stored. In response to an activation input, an activation signal based on stored data is generated and transmitted.

A method of programming a programmable remote control is also provided. User type input specifying activation signal type is received. If the user type input specifies variable code type, variable code activation signals are transmitted until user success input is received indicating a target appliance has been activated. If the user type input specifies fixed code type, user fixed code input providing a fixed code is received and fixed code activation signals are transmitted until user success input indicating the target appliance has been activated is received. Information specifying an activation signal for activating the target appliance based on the received user access input is stored.

A method of programming a programmable remote control programmable to a fixed code appliance activation scheme is also provided. A fixed code associated with a fixed code appliance is received. At least a first activation signal and a second activation signal are transmitted. Each of the first activation signal and the second activation signal are based on the same fixed code activation scheme. Each of the first activation signal and the second activation signal are based on the received fixed code, with the second activation signal based on a binary modification of the received code. The binary modification may be one or more of a bitwise reversal of the received fixed code and a bitwise inversion of the received fixed code.

A system for wirelessly activating an appliance is also provided. The system includes a radio frequency transmitter, memory holding data describing transmission schemes, and control logic. The control logic is capable of storing a fixed code. If a fixed code is stored, a sequence of fixed code activation schemes is transmitted until input indicating activation of the appliance is received. If no fixed code is stored, a sequence of rolling code activation schemes is transmitted until input indicating activation of the appliance is received. An indication as to which activation scheme activated the appliance is stored based on the received input. An activation signal is generated based on the stored indication and a received activation input.

The above features, and other features and advantages of the present invention are readily apparent from the following detailed descriptions thereof when taken in connection with the accompanying drawings.

BRIEF DESCRIPTION OF THE DRAWINGS

FIGS. 8–12 are flow diagrams illustrating programmable controller operation according to embodiments of the present invention;

FIGS. 13–16 are flow diagrams illustrating alternative programmable controller operation according to embodiments of the present invention;

DETAILED DESCRIPTION OF THE PREFERRED EMBODIMENT(S)

Figure 1:
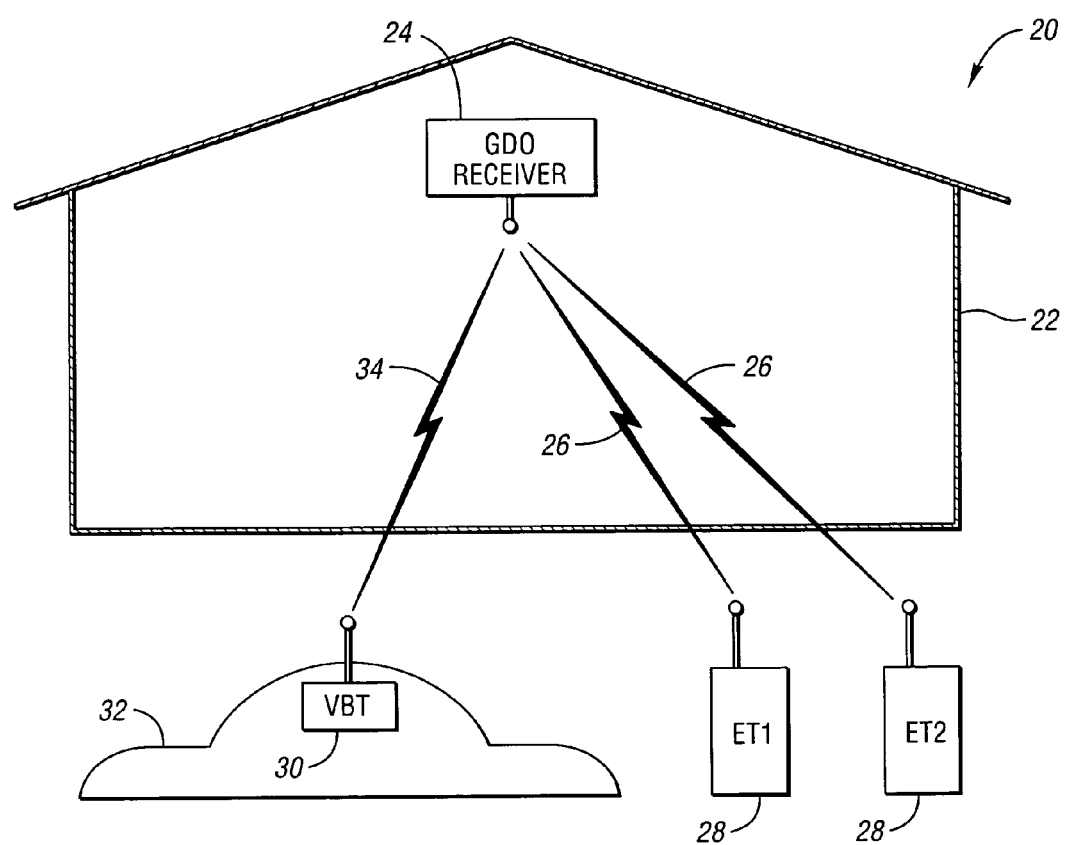
FIG. 1 is a block diagram illustrating an appliance control system according to an embodiment of the present invention.

Referring to FIG. 1, a block diagram illustrating an appliance control system according to an embodiment of the present invention is shown. An appliance control system, shown generally by 20, allows one or more appliances to be remotely controlled using radio transmitters. In the example shown, radio frequency remote controls are used to operate a garage door opener. However, the present invention may be applied to controlling a wide variety of appliances such as other mechanical barriers, lighting, alarm systems, temperature control systems, and the like.

Appliance control system 20 includes garage 22 having a garage door opener, not shown. Garage door opener (GDO) receiver 24 receives radio frequency control signals 26 for controlling a garage door opener. Activation signals have a transmission scheme which may be represented as a set of receiver characteristics. One or more existing transmitters (ET) 28 generate radio frequency activation signals 26 exhibiting the receiver characteristics in response to a user depressing an activation button.

A user of appliance control system 20 may wish to add a new transmitter to system 20. For example, a vehicle-based transmitter (VBT) including programmable control 30 may be installed in vehicle 32, which may be parked in garage 22. Vehicle-based transmitter 30 generates a sequence of activation signals 34 which includes an activation signal having characteristics appropriate to activate activating garage door opener receiver 24. In the embodiment shown, programmable control 30 is mounted in vehicle 32. However, as will be recognized by one of ordinary skill in the art, the present invention applies to universal remote controls that may also be hand-held, wall mounted, included in a key fob, and the like.

Figure 2:
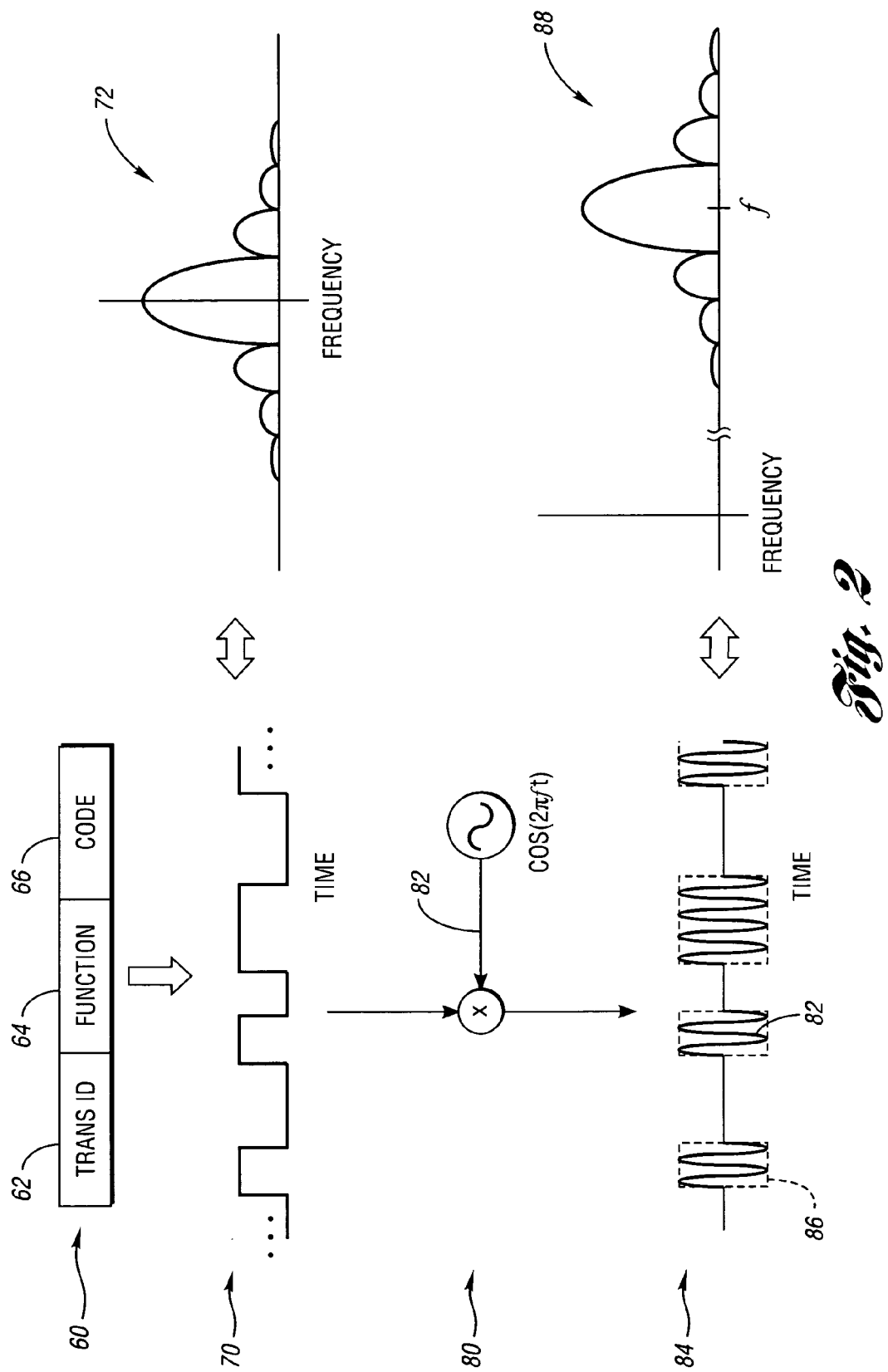
FIG. 2 is a schematic diagram illustrating activation signal characteristics according to an embodiment of the present invention.

Referring now to FIG. 2, a schematic diagram illustrating activation signal characteristics according to an embodiment of the present invention is shown. Information transmitted in an activation signal is typically represented as a binary data word, shown generally by 60. Data word 60 may include one or more fields, such as transmitter identifier 62, function indicator 64, code word 66, and the like. Transmitter identifier (TRANS ID) 62 uniquely identifies a remote control transmitter. Function indicator 64 indicates which of a plurality of functional buttons on the remote control transmitter were activated. Code word 66 helps to prevent misactivation and unauthorized access.

Several types of codes 66 are possible. One type of code is a fixed code, wherein each transmission from a given remote control transmitter contains the same code 66. In contrast, variable code schemes change the bit pattern of code 66 with each activation. The most common variable code scheme, known as rolling code, generates code 66 by encrypting a synchronization (sync) counter value. After each activation, the counter is incremented. The encryption technique is such that a sequence of encrypted counter values appears to be random numbers.

Data word 60 is converted to a baseband stream, shown generally by 70, which is an analog signal typically transitioning between a high voltage level and a low voltage level.

Multilevel transmissions are also possible. Various baseband encoding or modulation schemes are known, including polar signaling, on-off signaling, bipolar signaling, duobinary signaling, Manchester signaling, and the like. Baseband stream 70 has a baseband power spectral density, shown generally by 72, centered around a frequency of zero.

Baseband stream 70 is converted to a radio frequency signal through a modulation process shown generally by 80. Baseband stream 70 is used to modulate one or more characteristics of carrier 82 to produce a broadband signal, shown generally by 84. Modulation process 80, mathematically illustrated by multiplication in FIG. 2, implements a form of amplitude modulation commonly referred to as on-off keying. As will be recognized by one of ordinary skill in the art, many other modulation forms are possible, including frequency modulation, phase modulation, and the like. In the example shown, baseband stream 70 forms envelope 86 modulating carrier 82. As illustrated in broadband power spectral density 88, the effect in the frequency domain is to shift baseband power spectral density 72 up in frequency so as to be centered around the carrier frequency, f, of carrier 82.

Figure 3:
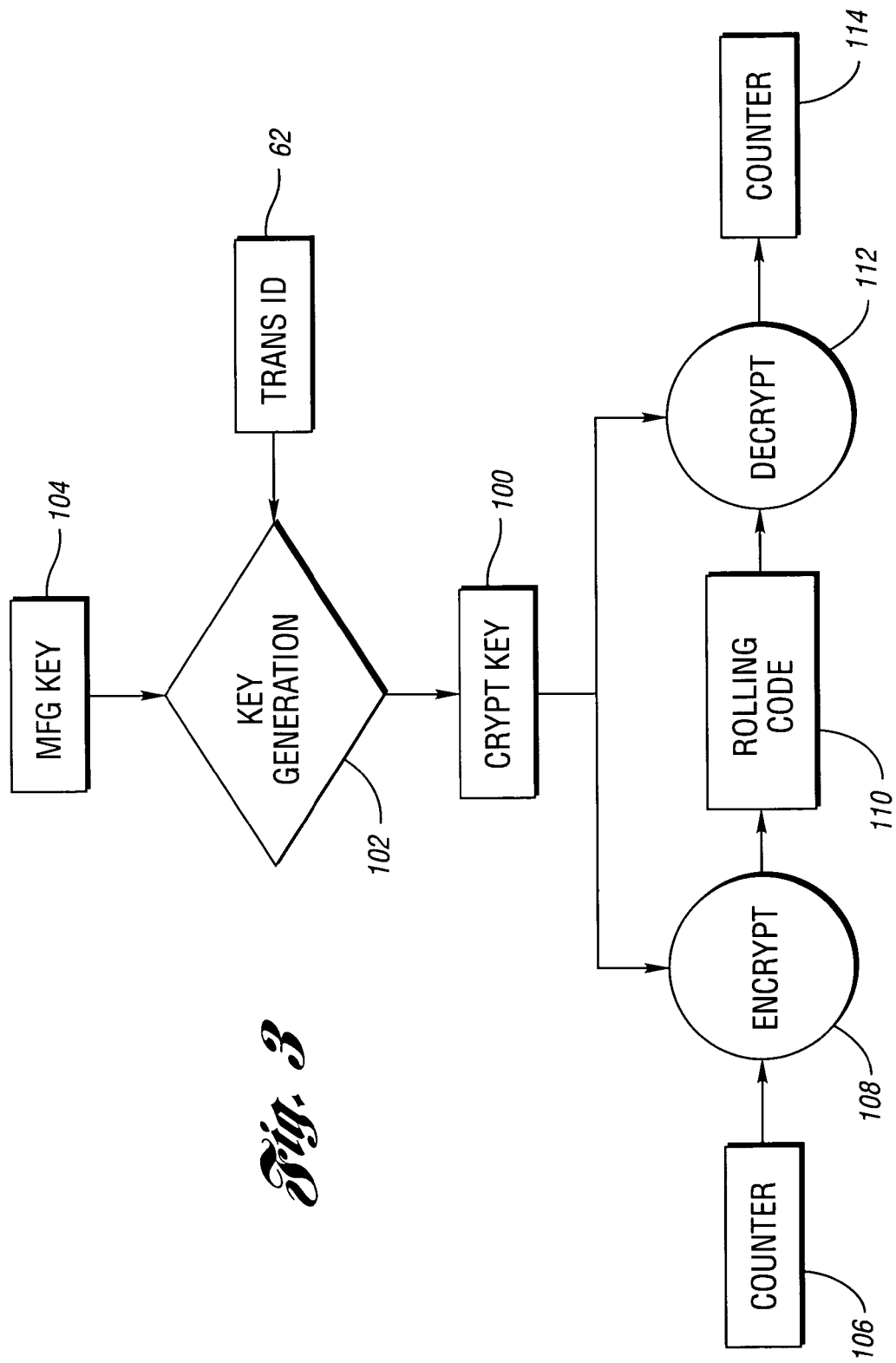
FIG. 3 is a block diagram illustrating rolling code operation that may be used with the present invention.

Referring now to FIG. 3, a block diagram illustrating rolling code operation that may be used with the present invention is shown. Remotely controlled systems using rolling code require crypt key 100 in both the transmitter and the receiver for normal operation. In a well-designed rolling code scheme, crypt key 100 is not transmitted from the transmitter to the receiver. Typically, crypt key 100 is generated using key generation algorithm 102 based on transmitter identifier 62 and a manufacturing (MFG) key 104. Crypt key 100 and transmitter identifier 62 are then stored in a particular transmitter. Counter 106 is also initialized in the transmitter. Each time an activation signal is sent, the transmitter uses encrypt algorithm 108 to generate rolling code value 110 from counter 106 using crypt key 100. The transmitted activation signal includes rolling code 110 and transmitter identifier 62.

A rolling code receiver is trained to a compatible transmitter prior to normal operation. The receiver is placed into a learn mode. Upon reception of an activation signal, the receiver extracts transmitter identifier 62. The receiver then uses key generation algorithm 102 with manufacturing key 104 and received transmitter identifier 62 to generate crypt key 100 identical to the crypt key used by the transmitter. Newly generated crypt key 100 is used by decrypt algorithm 112 to decrypt rolling code 110, producing counter 114 equal to counter 106. The receiver then saves counter 114 and crypt key 100 associated with transmitter identifier 62. As is known in the encryption art, encrypt algorithm 108 and decrypt algorithm 112 may be the same algorithm.

In normal operation, when the receiver receives an activation signal, the receiver first extracts transmitter identifier 62 and compares transmitter identifier 62 with all learned transmitter identifiers. If no match is found, the receiver rejects the activation signal. If a match is found, the receiver retrieves crypt key 100 associated with received transmitter identifier 62 and decrypts rolling code 110 from the received activation signal to produce counter 114. If received counter 106 matches counter 114 associated with transmitter identifier 62, activation proceeds. Received counter 106 may also exceed stored counter 114 by a preset amount for successful activation.

Another rolling code scheme generates crypt key 100 based on manufacturing key 104 and a "seed" or random number. An existing transmitter sends this seed to an appliance receiver when the receiver is placed in learn mode. The transmitter typically has a special mode for transmitting the seed that is entered, for example, by pushing a particular combination of buttons. The receiver uses the seed to generate crypt key 100. As will be recognized by one of ordinary skill in the art, the present invention applies to the use of a seed for generating a crypt key as well as to any other variable code scheme.

Figure 4:
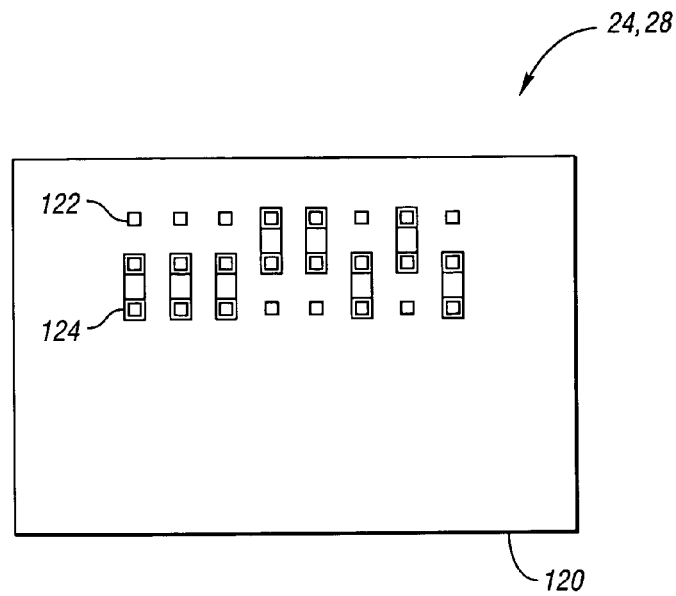
FIG. 4 is a schematic diagram illustrating a fixed code setting which may be used according to an embodiment of the present invention.

Referring now to FIG. 4, a schematic diagram illustrating a fixed code setting which may used according to an embodiment of the present invention is shown. Fixed code systems typically permit a user to set the fixed code value through a set of DIP switches or jumpers. For example, fixed code receiver 24 and transmitter 28 may each include printed circuit board 120 having a plurality of pins, one of which is indicated by 122, together with support electronics, not shown. Pins 122 are arranged in a grid having three rows and a number of columns equal to the number of bits in the fixed code value. A jumper, one of which is indicated by 124, is placed in each column straddling either the first and second pins or the second and third pins. One position represents a logical "1" and the other position represents a logical "0." Various alternative schemes are also possible. For example, two rows may be used, with the presence or absence of jumper 124 indicating one of the logical binary values. As another alternative, a set of DIP switches may be used with "up" representing one binary value and "down" representing the other.

In various embodiments of the present invention, a user is asked to read the fixed code value from existing transmitter 28 or appliance receiver 24 and enter this fixed code value into programmable control 30. A difficulty experienced by users asked to read such values is in determining from which end to start. Another difficulty is in determining which setting represents a binary "1" and which setting represents a binary "0." For example, the pattern represented in FIG. 4 may be interpreted as "00011010," "11100101," "01011000" or "10100111." Entering an incorrect value can frustrate a user who is not sure why he cannot program his fixed code transmitter. To rectify this situation, embodiments of the present invention transmits fixed code activation signals based on the fixed code value as entered by the user and at least one of a bitwise reversal of the fixed code, a bitwise inversion of the fixed code, and both a bitwise reversal and inversion.

Figure 5:
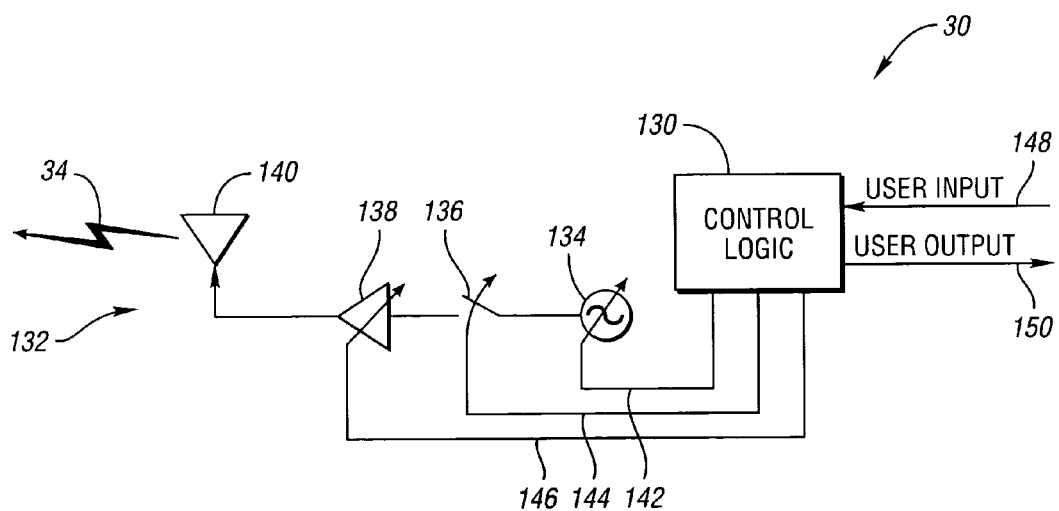
FIG. 5 is a block diagram illustrating a programmable remote control according to an embodiment of the present invention.

Referring now to FIG. 5, a block diagram illustrating a programmable remote control according to an embodiment of the present invention is shown. Programmable control 30 includes control logic 130 and a transmitter section, shown generally by 132. Transmitter section 132 includes variable frequency oscillator 134, modulator 136, variable gain amplifier 138 and antenna 140. For each activation signal in sequence of activation signals 34, control logic 130 sets the carrier frequency of the activation signal generated by variable frequency oscillator 134 using frequency control signal 142. Control logic 132 modulates the carrier frequency with modulator 136, modeled here as a switch, to produce an activation signal which is amplified by variable gain amplifier 138. Modulator 136 may be controlled by shifting a data word serially onto modulation control signal 144. Other forms of modulation are possible, such as frequency modulation, phase modulation, and the like. Variable gain amplifier 138 is set to provide the maximum allowable output power to antenna 140 using gain control signal 146.

Control logic 130 receives user input 148 providing fixed code programming information and activation inputs. User input 148 may be implemented with one or more switches directly connected to control logic 130. Alternatively, user input 148 may be provided through remote input devices connected to control logic 130 via a serial bus. Control logic 130 generates one or more user outputs 150. User outputs 150 may include indicator lamps directly connected to control logic 130 and/or remote display devices connected to control logic 130 through a serial bus.

Figure 6:
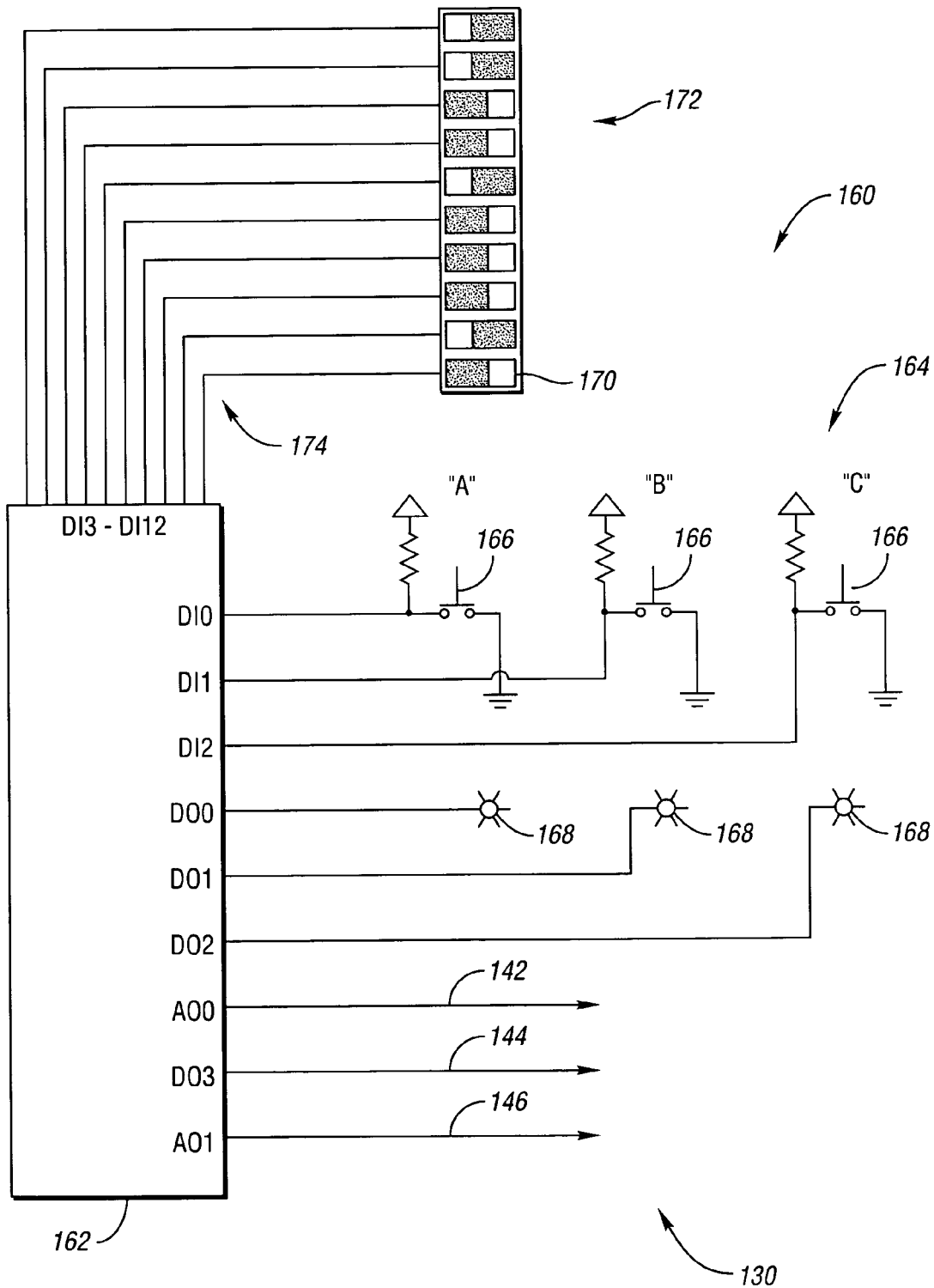
FIG. 6 is a schematic diagram illustrating control logic and a user interface according to an embodiment of the present invention.
Figure 7:
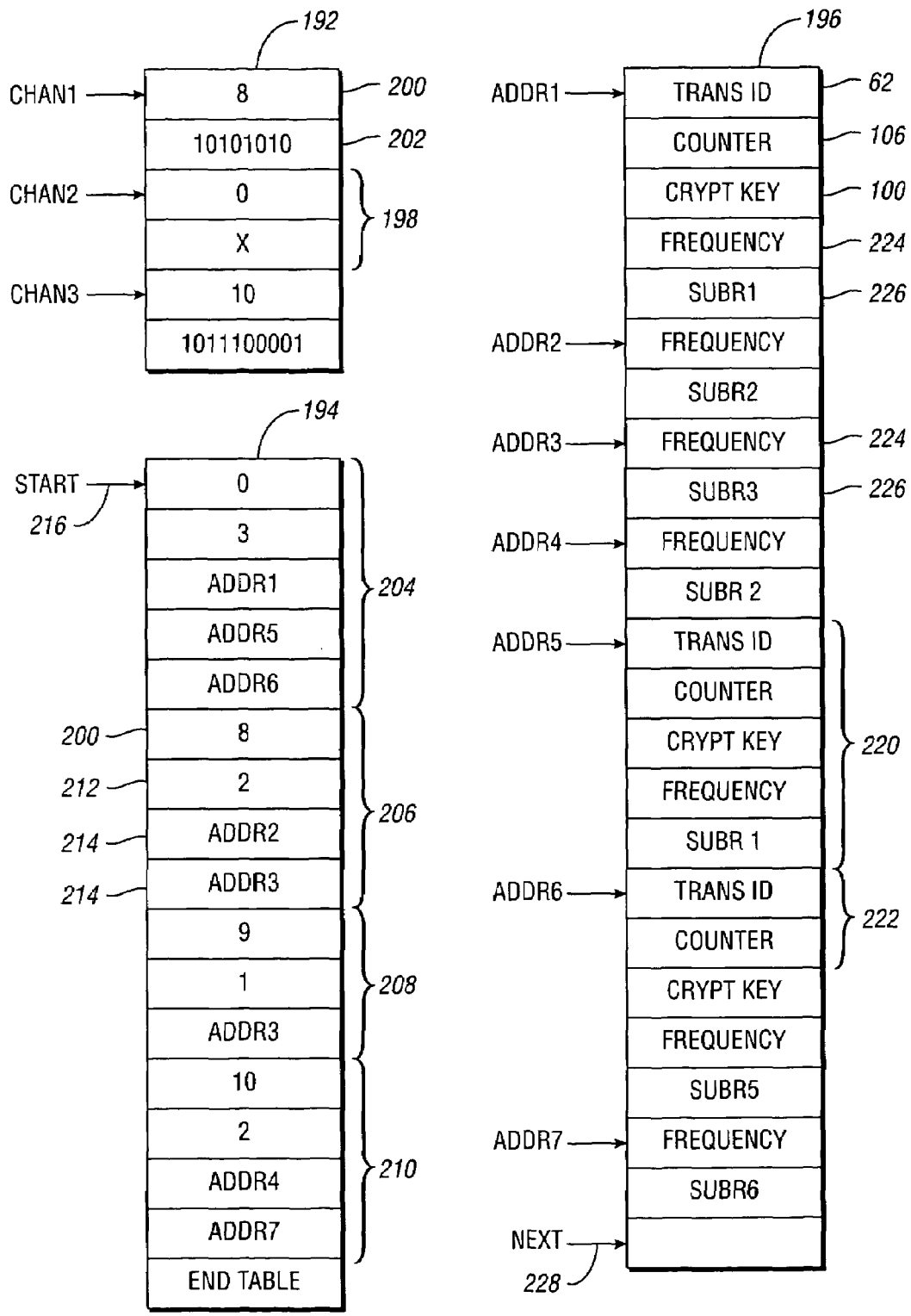
FIG. 7 is a memory map for implementing control modes according to an embodiment of the present invention.

Referring now to FIG. 6, a schematic diagram illustrating control logic and a user interface according to an embodiment of the present invention is shown. Control logic 130 and electronics for a user interface, shown generally by 160, can be implemented with microcontroller 162. User interface 160 includes at least one activation input, shown generally by 164. Three activation inputs 164 are shown, labeled "A," "B" and "C." Each activation input 164 is implemented with one pushbutton switch 166. Each pushbutton switch 166 provides a voltage signal to a digital input (DI) for microcontroller 162. User interface 160 also includes one indicator lamp 168 associated with each activation input 164. Each indicator lamp 168 may be implemented using one or more light emitting diodes supplied by a digital output (DO) from microcontroller 162.

User interface 160 can include a plurality of DIP switches, one of which is indicated by 170, for implementing programming input 172. DIP switches 170 are set to match the fixed code value from fixed code appliance receiver 24 or associated existing transmitter 28. Microcontroller 162 reads DIP switches 170 using parallel bus 174. Alternatively, programming input 172 may be implemented using pushbutton switches 166 as will be described in greater detail below.

Microcontroller 162 generates control signals determining characteristics of transmitted activation signals. Frequency control signal 142 is delivered from an analog output (AO) on microcontroller 162. For example, if variable frequency oscillator 134 is implemented using a voltage controlled oscillator, varying the voltage on frequency control signal 142 will control the carrier frequency of the activation signal. Frequency control signal 142 may also be one or more digital outputs used to select between fixed frequency sources. Modulation control signal 144 is provided by a digital output on microcontroller 162. The fixed or rolling code data word is put out on modulation control 144 in conformance with the baseband modulation and bit rate characteristics of the activation scheme being implemented. Microcontroller 162 generates gain control signal 146 as an analog output for controlling the amplitude of the activation signal generated. As will be recognized by one of ordinary skill in the art, analog output signals may be replaced by digital output signals feeding an external digital-to-analog converter.

Referring now to FIG. 6, a memory map for implementing operating modes according to an embodiment of the present invention is shown. A memory map, shown generally by 190, represents the allocation of memory for data tables used by programmable control 30. Preferably, this data is held in non-volatile memory such as flash memory. Memory map 190 includes channel table 192, mode table 194 and scheme table 196.

Channel table 192 includes a channel entry, one of which is indicated by 198, for each channel supported by programmable control 30. Typically, each channel corresponds to a user activation input. In the example illustrated in FIG. 6, three channels are supported. Each channel entry 198 has two fields, mode indicator 200 and fixed code 202. Mode indicator 200 indicates the mode programmed for that channel. In the embodiment shown, a zero in mode indicator 200 indicates rolling code mode. A non-zero integer in mode indicator 200 indicates a fixed code mode with a code size equal to the integer value. For example, the first channel (CHAN1) has been programmed for eight-bit fixed code operation, the second channel (CHAN2) has been programmed for rolling code operation and the third channel (CHAN3) has been programmed for ten-bit fixed code operation. Fixed code value 202 holds the programmed fixed code for a fixed code mode. Fixed code value 202 may also hold function code 64 in fixed code modes. Fixed code value 202 may hold function code 64 or may not be used at all in a channel programmed for a rolling code mode.

Mode table 194 contains an entry for each mode supported. The four entries illustrated are rolling code entry 204, eight-bit fixed code entry 206, nine-bit fixed code entry 208 and ten-bit fixed code entry 210. Each entry begins with mode indicator 200 for the mode represented, the next value is scheme count 212 indicating the number of schemes to be sequentially transmitted in that mode. Following scheme count 212 is a scheme address 214 for each scheme. The address of the first entry of mode table 194 is held in table start pointer 216 known by control logic 130. When accessing data for a particular mode, control logic 130 searches through mode table 194 for mode indicator 200 matching the desired mode. The use of mode indicators 200 and scheme counts 212 provides a flexible representation for adding new schemes to each mode and adding new modes to mode table 194.

Scheme table 196 holds characteristics and other information necessary for generating each activation signal in sequence of activation signals 34. Scheme table 196 includes a plurality of rolling code entries, one of which is indicated by 220, and a plurality of fixed code entries, one of which is indicated by 222. Each rolling code entry 220 includes transmitter identifier 62, counter 106, crypt key 100, carrier frequency 224, and subroutine address 226. Subroutine address 226 points to code executable by control logic 130 for generating an activation signal. Additional characteristics may be embedded within this code. Each fixed code entry 222 includes carrier frequency 224 and subroutine address 226. Next pointer 228 points to the next open location after scheme table 196. Any new schemes received by control logic 130 may be appended to scheme table 196 using next pointer 228.

Memory map 190 illustrated in FIG. 6 implements a single rolling code mode and three fixed code modes based on the fixed code size. Other arrangement of modes are possible. For example, more than one rolling code modes may be used. Only one fixed code mode may be used. If more than one fixed code mode is used, characteristics other than fixed code size may be used to distinguish between fixed code modes. For example, fixed code schemes may be grouped by carrier frequency, modulation technique, baseband modulation, and the like.

In other alternative embodiments, channel table 192 can hold different values for channel entries 198. For example, each channel entry 198 could include scheme address 214 of a successfully trained scheme as well as fixed code value 202.

Referring now to FIGS. 8–16, flow charts illustrating programmable control operation according to embodiments of the present invention are shown. As will be appreciated by one of ordinary skill in the art, the operations illustrated are not necessarily sequential operations. Similarly, operations may be performed by software, hardware, or a combination of both. The present invention transcends any particular implementation and the aspects are shown in sequential flowchart form for ease of illustration.

Figure 8:
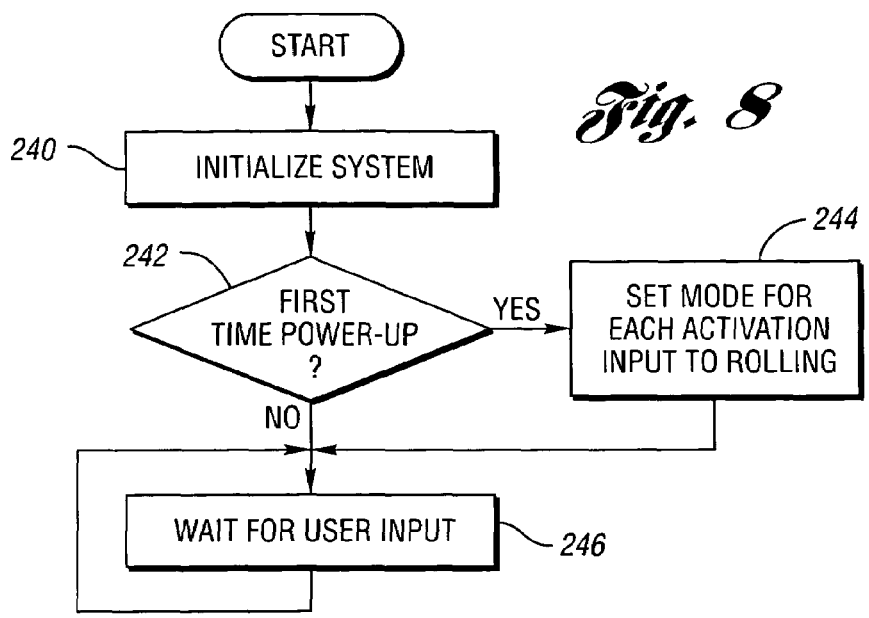

Referring to FIG. 8, a top level flowchart is shown. System initialization occurs, as in block 240. Control logic 130 is preferably implemented with a microcontroller. Various ports and registers are typically initialized on power up. A check is made to determine if this is a first power up occurrence, as in block 242. If so, the mode for each channel is set to rolling code, as in block 244. The system then waits for user input, as in block 246. This waiting may be done either with power applied or removed.

Figure 9:
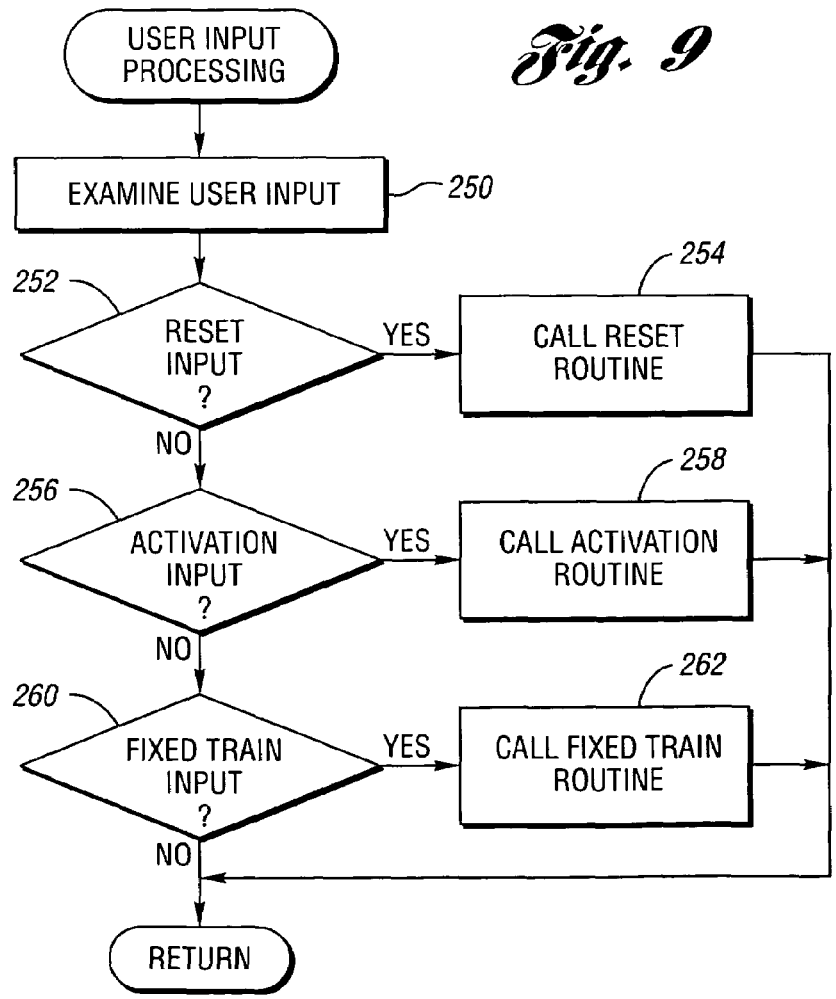

Referring now to FIG. 9, a flowchart illustrating response to user input is shown. The user input is examined, as in block 250. A check is made for reset input, as in block 252. If so, a reset routine is called, as in block 254. If not, a check is made for activation input, as in block 256. If so, an activation routine is called, as in block 258. If not, a check is made to determine if fixed code training input has been received, as in block 260. If so, a fixed code training routine is called, as in block 262. Other input options are possible, such as placing programmable control 30 into a download mode for receiving data related to adding or changing activation schemes.

Interpreting user input depends upon the type of user input supported by programmable control 30. For a simple pushbutton system, a button depression of short duration may be used to signify activation input for the channel assigned to the button. Holding the button for a moderate length of time may be used to signify fixed training input. Holding the button for an extended period of time may be used to indicate reset input. Alternatively, different combinations of buttons may be used to place programmable control 30 into various modes of operation.

Figure 10:
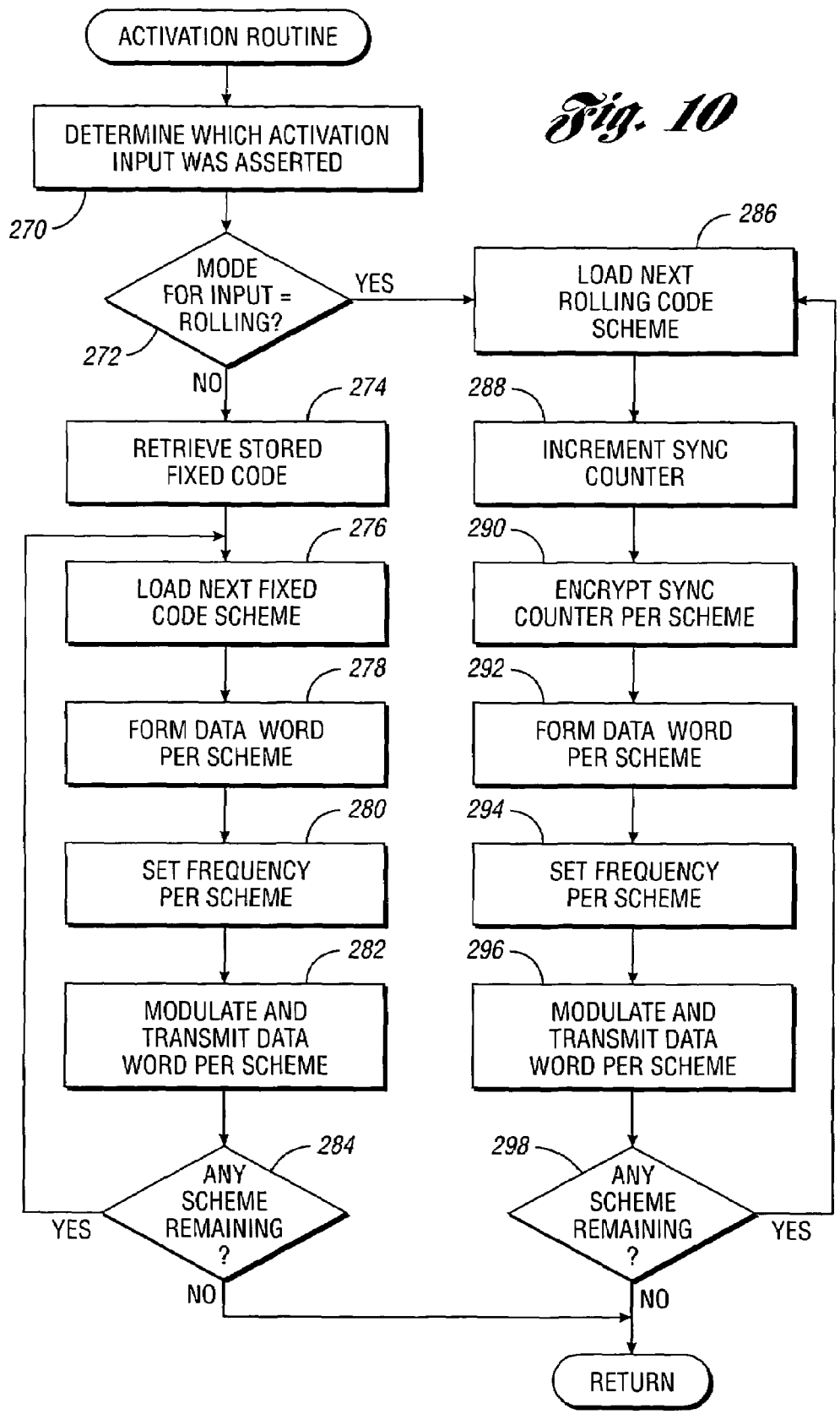

Referring now to FIG. 10, a flowchart illustrating an activation routine is shown. A determination is made as to which activation input was asserted, as in block 270. For the selected channel, a check is made to determine under which mode the activation input channel is operating, as in block 272. This determination can be accomplished by examining channel table 192 as described above. For a fixed code mode, the stored fixed code is retrieved, as in block 274. A loop is executed for each scheme associated with the fixed code mode. Characteristics for the next scheme are loaded, as in block 276. This may be accomplished, for example, by obtaining a pointer to an entry in scheme table 196. A data word is formed using the fixed code, as in block 278. The frequency is set, as in block 280. The data word is modulated and transmitted, as in block 282. A check is made to determine if any schemes remain, as in block 284. If so, blocks 276, 278, 280 and 282 are repeated. If not, the activation routine terminates.

Considering again block 272, if the channel mode corresponding to the asserted input is a rolling code mode, a rolling code activation signal loop is entered. Characteristics of the next rolling code scheme are loaded, as in block 286. The synchronization counter associated with the current scheme is incremented, as in block 288. The incremented counter value is also stored. The synchronization counter is encrypted using the crypt key to produce a rolling code value, as in block 290. A data word is formed using the rolling code value, as in block 292. The carrier frequency is set, as in block 294. The data word is modulated and transmitted, as in block 296. A check is made to determine if any schemes remain in the rolling code mode, as in block 298. If so, blocks 286, 288, 290, 292, 294 and 296 are repeated. If no schemes remain, the activation routine is terminated.

Figure 11:
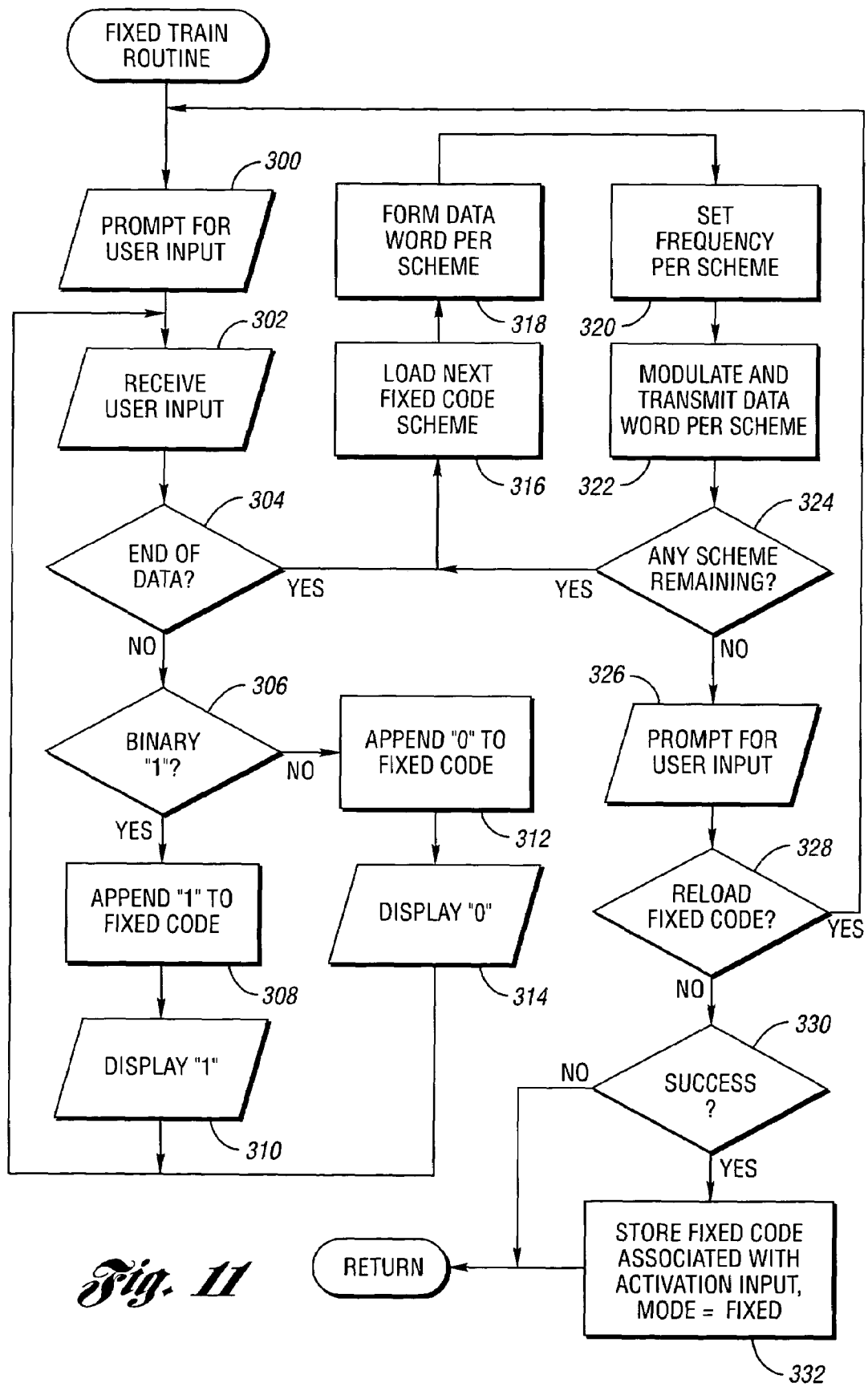

Referring now to FIG. 11, a flow chart illustrating fixed code training is shown. The user is prompted for input, as in block 300. Prompting may be accomplished, for example, by flashing one or more of indicator lamps 168. Alternatively, other audio and/or visual prompts may be provided to the user as will be described in greater detail below. User input is received, as in block 302. The user enters a fixed code value. This value may be entered in parallel such as, for example, through the use of DIP switches 170. The user may also enter fixed code information through one or more remote user inputs as will be described in greater detail below. Activation inputs 164 provide another means for inputting a fixed code value. In a three button system, a first button can be used to input a binary "1," a second button can be used to input a binary "0" and a third button can be used to indicate completion.

Blocks 304 through 314 describe serially inputting a fixed code value using activation inputs 164. A check is made to determine if an end of data input was received, as in block 304. If not, a check is made to see if the input value was a binary "1," as in block 306. If so, a binary "1" is appended to the fixed code value, as in block 308, and an indication of binary "1" is displayed, as in block 310. This display may be, for example, illuminating indicator lamp 168 associated with activation input 164 used to input the binary "1." Returning to block 306, if a binary "1" was not input, a binary "0" is appended to the fixed code, as in block 312. A display indicating a binary "0" is provided, as in block 314.

Returning now to block 304, once the fixed code value has been received, a loop is entered to generate a sequence of at least one fixed code activation signal. The next fixed code scheme is loaded, as in block 316. Preferably, this scheme is based on the number of bits in the received fixed code. A data word is formed based on the loaded fixed scheme, as in block 318. This data word includes the received fixed code either as received or as a binary modification of the received fixed code. The carrier frequency is set based on the loaded scheme, as in block 320. The carrier is modulated and the resulting activation signal transmitted, as in block 322. A check is made to determine if any schemes remain, as in block 324. If so, the operations indicated in blocks 316, 318, 320 and 322 are repeated. If not, the user is prompted for input and the input received, as in block 326. One possible indication from the user is a desire to reload the fixed code, as in block 328. If so, the operation returns to block 300. If not, a check is made to determine if user input indicates success, as in block 330. If so, the fixed code is stored associated with a specified activation input and the mode is changed to fixed, as in block 332.

Referring now to FIG. 12, a reset routine is shown. Each activation input channel is set to rolling mode, as in block 340. The user is notified of successful reset, as in block 342. Once again, a pattern of flashing indicator lamps may be used for this indication. Alternatively, if a reset routine is entered by asserting a particular user input 164 such as, for example, by depressing pushbutton switch 166 for an extended period of time, then only the mode corresponding to that user input need be reset by the reset routine.

Referring now to FIGS. 13–16, flowcharts illustrating alternative programmable controller operation according to embodiments of the present invention are shown. In FIG. 13, user input processing including rolling code training is provided. User input is examined, as in block 350. A determination is made as to whether or not the input indicates a reset, as in block 352. If so, a reset routine is called, as in block 354. A determination is made as to whether or not the input specified rolling code training, as in block 356. If so, a rolling code training routine is called, as in block 358. If not, a determination is made as to whether fixed code training input was received, as in block 360. If so, a fixed code training routine is called, as in block 362. If not, a determination is made as to whether or not one of at least one activation inputs was received, as in block 364. If so, an activation routine is called, as in block 366. Other inputs are possible such as, for example, input specifying a data download for adding or changing activation signal schemes or modes.

Figure 14:
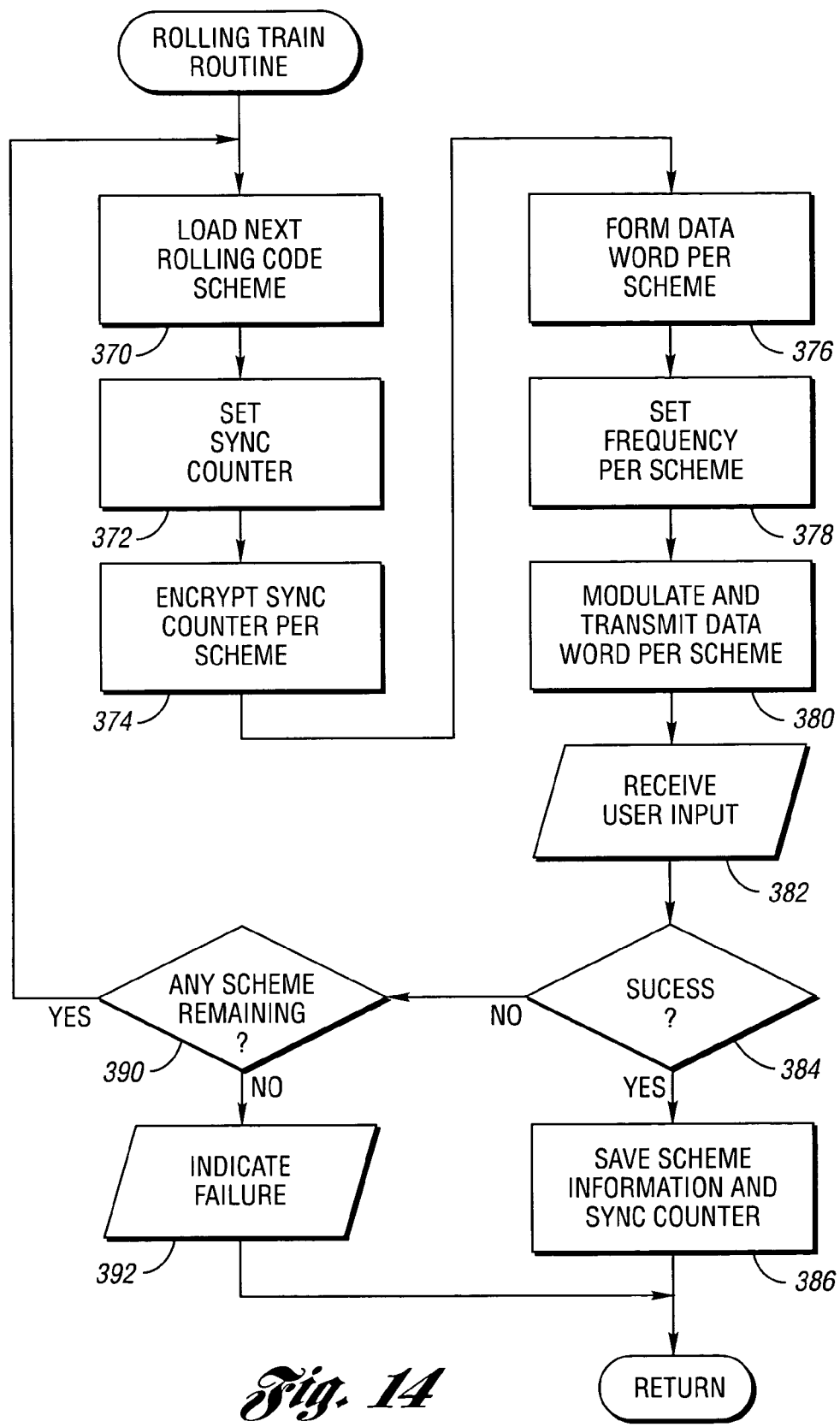

Referring now to FIG. 14, a rolling code training routine is provided. The routine includes a loop in which one or more rolling code activation signals are sent as a test. A user provides feedback regarding whether or not the target appliance was activated.

The next rolling code scheme in the sequence is loaded, as in block 370. The sync counter, upon which the rolling code is based, is initialized, as in block 372. The sync counter is encrypted according to the current scheme to generate a rolling code value, as in block 374. A data word is formed including the generated rolling code value, as in block 376. The carrier is set, as in block 378. The data word is used to modulate the carrier according to the current scheme, as in block 380. The resulting activation signal is then transmitted.

The guess-and-test approach requires interaction with the user. In one embodiment, the test pauses until either a positive input or a negative input is received from the user, as in block 382. In another embodiment, the test pauses for a preset amount of time. If no user input is received within this time, the system assumes the current test has failed. A check for success is made, as in block 384. If the user indicates activation, information indicating the one or more successful schemes is saved, as in block 386. This information may be associated with a particular user activation input. The user may assign a particular user activation input as part of block 382 or may be prompted to designate an activation input as part of block 386.

Returning to block 384, if the user did not indicate successful activation, a check is made to determine if any schemes remain, as in block 390. If not, a failure indication is provided to the user, as in block 392. This indication may consist of a pattern of flashing indicator lamps, an audio signal, a pattern on a video display, or the like. If any schemes remain, the test loop is repeated.

The training routine illustrated in FIG. 14 indicates a single activation signal is generated for each test. However, multiple activation signals may be generated and sent with each test. In one embodiment, further tests are conducted to narrow down which scheme or schemes successfully activated the appliance. In another embodiment, the programmable control stores information indicating the successful sequence so that the successful sequence is retransmitted each time the appropriate activation input is received.

Figure 15:
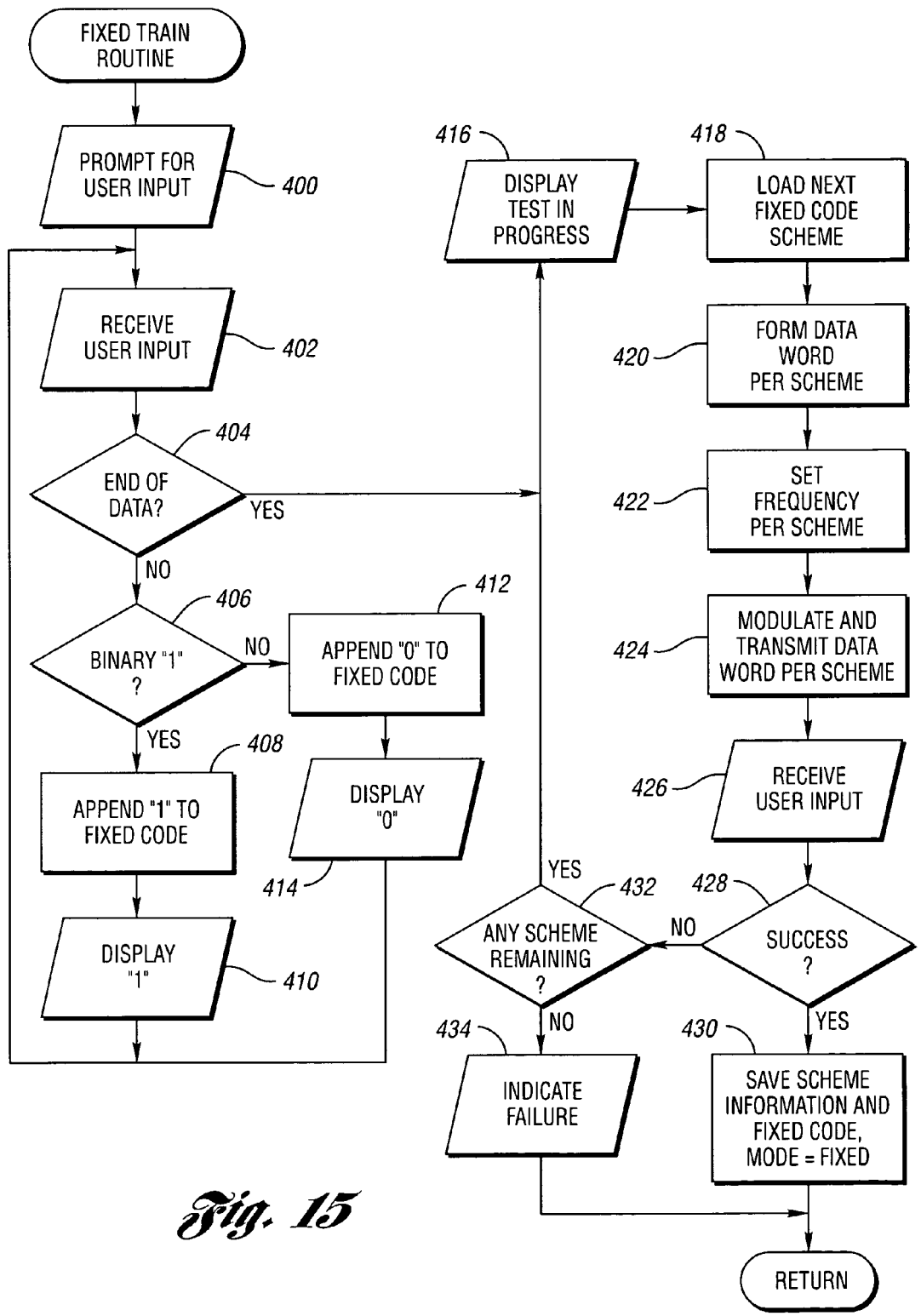

Referring now to FIG. 15, an alternative fixed code training routine is provided. The user is prompted to input a fixed code value, as in block 400. User input is received, as in block 402. As previously discussed, the fixed code value may be input serially or parallelly through one or more of a variety of inputs including specially designated programming switches, activation inputs, remote input devices, and the like. If the fixed code value is serially entered by the user, a check is made to determine end of data, as in block 404. If input did not indicate end of data, a check is made to determine if a binary "1" was input, as in block 406. If so, a binary "1" is appended to the fixed code, as in block 408, and a binary "1" is displayed to the user, as in block 410. If not, a binary "0" is appended to the fixed code, as in block 412, and a binary "0" is displayed to the user, as in block 414.

Returning to block 404, once the fixed code value is received a guess-and-test loop is entered. A display may be provided to the user indicating that the test is in progress, as in block 416. Information describing the next fixed code scheme is loaded, as in block 418. A data word is formed containing the fixed code, as in block 420. The carrier frequency is set, as in block 422. The data word is used to modulate the carrier, producing an activation signal, which is then transmitted, as in block 424. User input regarding the success of the test is received, as in block 426. Once again, the system may pause for a preset amount of time and, if no input is received, assume that the test was not successful. Alternatively, the system may wait for user input specifically indicating success or failure. A check is made to determine whether or not the test was successful, as in block 428. If so, information specifying the one or more successful schemes and the fixed code value are saved. This information may be associated with a particular activation input specified by the user. In addition, the mode is changed to fixed mode for the selected activation input. If success was not indicated, a check is made to determine if any schemes remain, as in block 432. If not, failure is indicated to the user, as in block 434. If any schemes remain, the test loop is repeated.

The guess-and-test scheme illustrated in FIG. 15 generates and transmits a single activation signal with each pass through the loop. However, as with rolling code training, more than one fixed code activation signal may be sent within each test. Once success is indicated, the user may be prompted to further narrow the selection of successful activation signals. Alternatively, information describing the sequence can be stored and the entire sequence retransmitted upon receiving an activation signal to which the sequence is associated.

Figure 16:
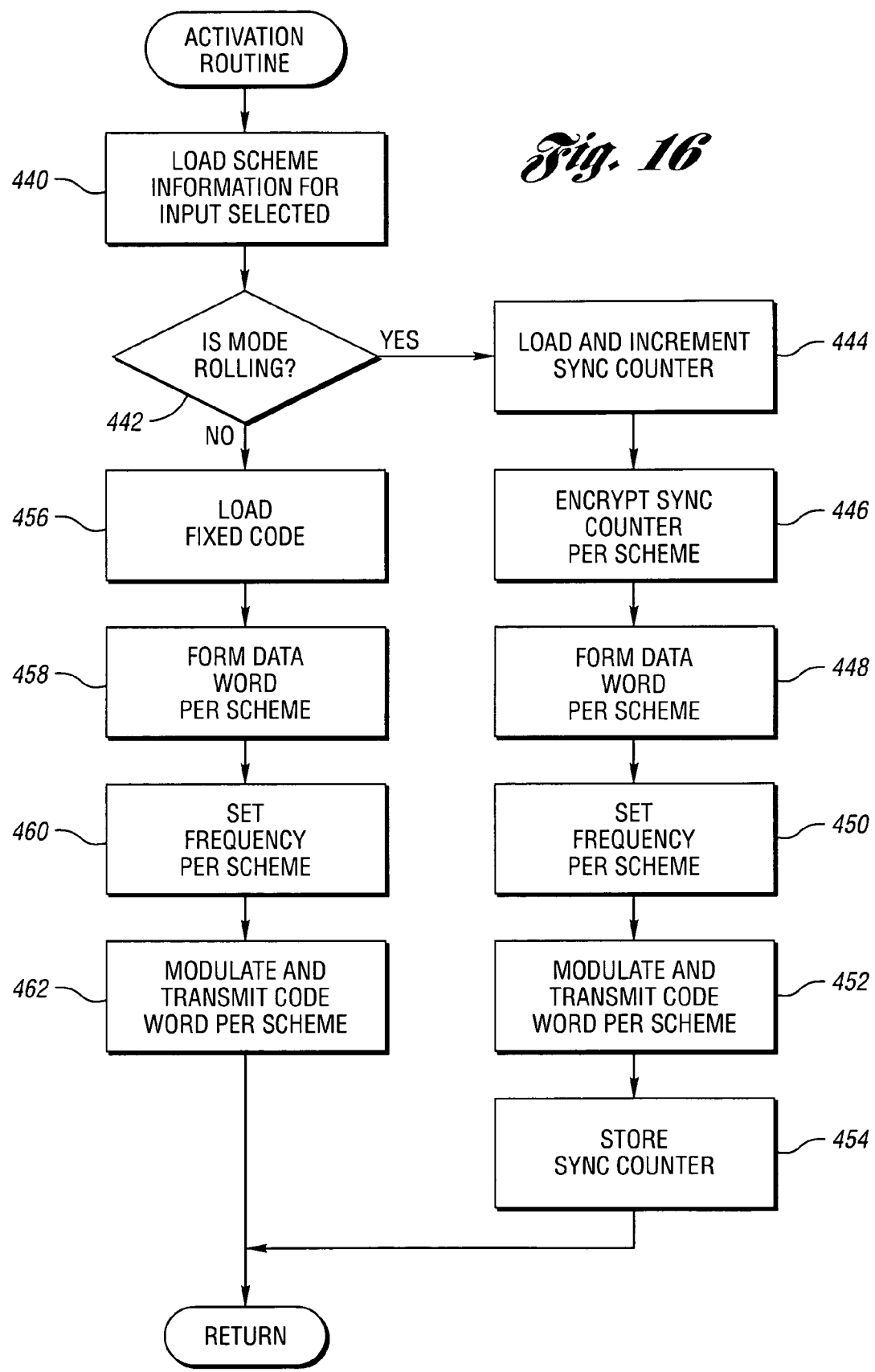

Referring now to FIG. 16, a flow chart illustrating an activation routine according to an embodiment of the present invention is shown. Information associated with an asserted activation input is retrieved, as in block 440. A check is made to determine if the mode associated with the activation channel is rolling, as in block 442. If so, the sync counter is loaded and incremented, as in block 444. The sync counter is encrypted to produce a rolling code value, as in block 446. A data word is formed including the rolling code value, as in block 448. The carrier frequency is set, as in block 450. The data word is used to modulate the carrier frequency, producing an activation signal which is then transmitted, as in block 452. The sync counter is stored, as in block 454.

Returning to block 442, if the mode is not rolling, the stored fixed code value is retrieved, as in block 456. A data word is formed including the retrieved fixed code, as in block 458. The carrier frequency is set, as in block 460. The data word is used to modulate the carrier, producing an activation signal which is then transmitted, as in block 462.

Various embodiments for programming to fixed and rolling code appliances and for responding to activation input for fixed and rolling code appliances have been provided. As will be recognized by one of ordinary skill in the art, these methods may be combined in any manner. For example, programmable control 30 may implement a system which transmits every rolling code activation signal upon activation of a rolling code channel and uses guess-and-test training for programming a fixed code channel. As another example, programmable control 30 may be configured for guess-and-test training using every possible rolling code scheme but, when training for fixed code, generates and transmits activation signals based on only those fixed code schemes known to be used with a fixed code value having a number of bits equal to the number of bits of the fixed code value entered by the user.

Figure 17:
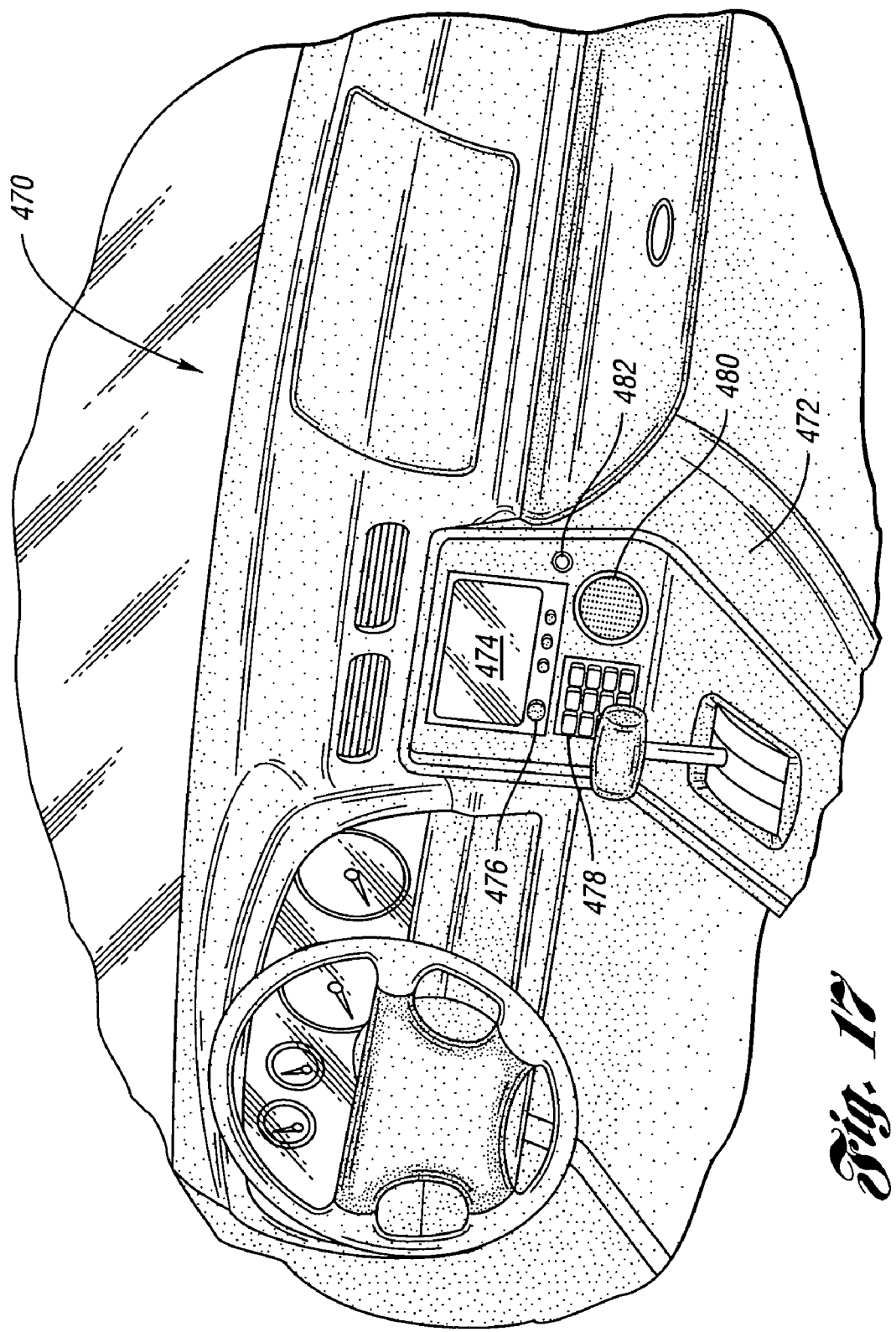
FIG. 17 is a drawing illustrating a vehicle interior that may be used to program a programmable controller according to an embodiment of the present invention.

Referring now to FIG. 17, a drawing illustrating a vehicle interior that may be used to program a programmable controller according to an embodiment of the present invention is shown. A vehicle interior, shown generally by 470, includes console 472 having one or more of a variety of user interface components. Graphical display 474 and associated display controls 476 provide an interactive device for HVAC control, radio control, lighting control, vehicle status and information display, map and positioning display, routing and path planning information, and the like. Display 204 can provide instructions for programming and using programmable control 30. Display 474 can also provide status and control feedback to the user in training and operating modes. Display controls 476 including, if available, touch-screen input provided by display 474 can be used to provide programming input. In addition, display 474 and controls 476 may be used as activation inputs for programmable control 30.

Console 472 includes numeric keypad 478 associated with an in-vehicle telephone. For fixed code training, numeric keypad 478 can be used to enter the fixed code value. Programmable control 30 may also recognize one or a sequence of key depressions on keypad 478 as an activation input.

Console 472 may include speaker 480 and microphone 482 associated with an in-vehicle telephone, voice activated control system, entertainment system, audible warning system, and the like. Microphone 482 may be used to provide activation and/or programming inputs. Speaker 480 can provide audio feedback during programming and/or activation modes. In addition, microphone 482 and speaker 480 may be used to provide programming instructions, interactive help, and the like.

Figure 18:
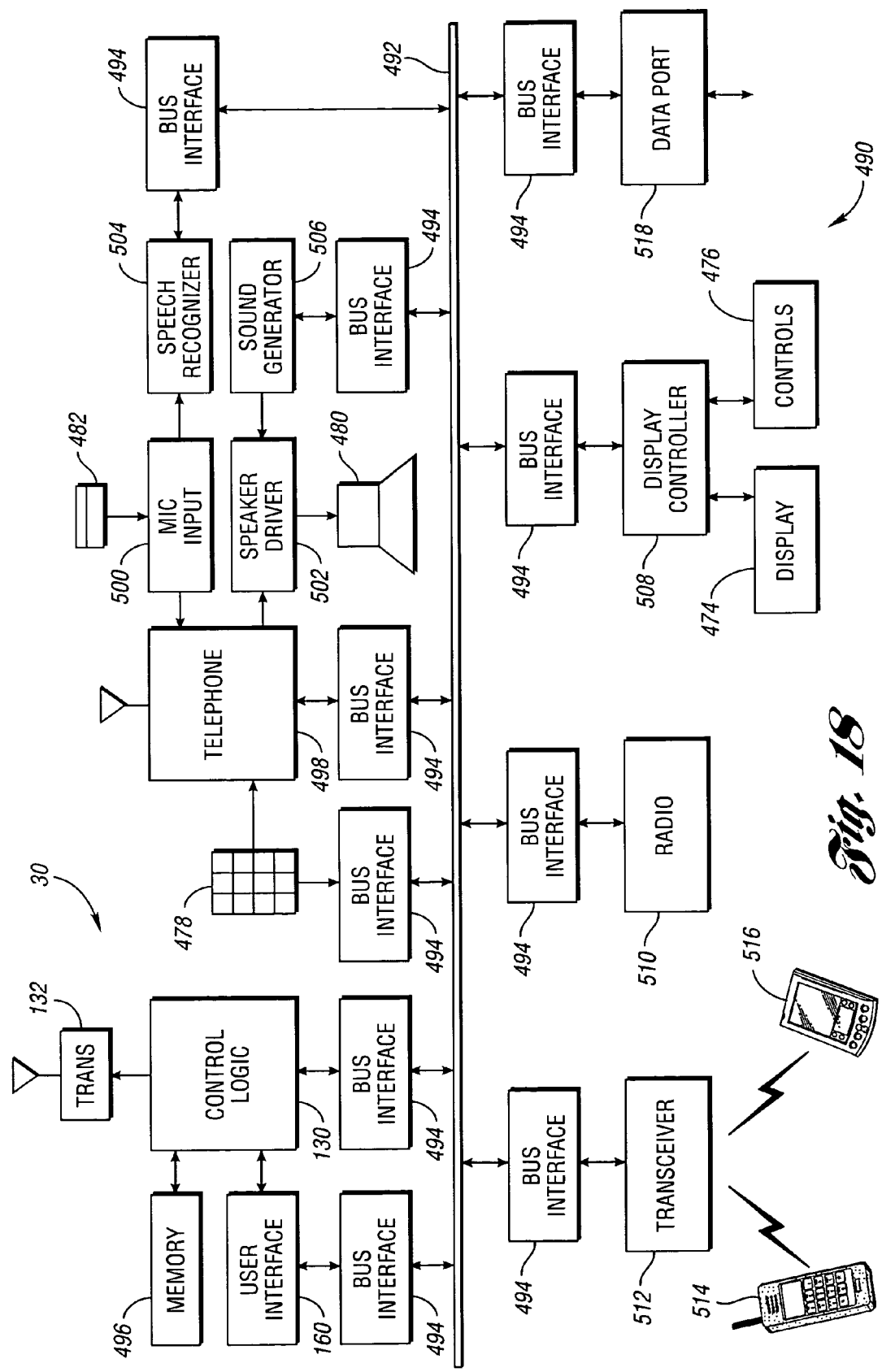
FIG. 18 is a block diagram illustrating a bus-based automotive vehicle electronics system according to an embodiment of the present invention.

Referring now to FIG. 18, a block diagram illustrating a bus-based automotive vehicle electronic system according to an embodiment of the present invention is shown. An electronic system, shown generally by 490, includes interconnecting bus 492. Automotive communication buses may be used to interconnect a wide variety of components within the vehicle, some of which may function as interface devices for programming or activating appliance controls. Many standards exist for specifying bus operations such as, for example, SAE J-1850, Controller Area Network (CAN), and the like. Various manufacturers provide bus interfaces 224 that handle low level signaling, handshaking, protocol implementation and other bus communication operations.

Electronics system 490 includes programmable control 30. Programmable control 30 includes at least control logic 130 and transmitter (TRANS) 132. Control logic 130 accesses memory 496, which holds a plurality of activation schemes. Each scheme describes activation control signals used by control logic 130 to transmit activation signals by transmitter 132. User interface 160 interfaces control logic 130 with user activation inputs and outputs, not shown. User interface 160 may be directly connected to control logic 130 or may be connected through bus 492. This latter option allows control logic 130 and transmitter 132 to be located anywhere within vehicle 32.

Electronics system 490 may include wireless telephone 498 interfaced to bus 492. Telephone 498 can receive input from keypad 478 and from microphone 482 through microphone input 500. Telephone 498 provides audio output to speaker 480 through speaker driver 502. Telephone 498 may be used to contact a human or automated help system and may also be used as a data port to download scheme and software updates into memory 496. Keypad 478 may be directly interfaced to bus 492 allowing keypad 478 to provide user input to control logic 130. Microphone 482 provides voice input through microphone input 500 to speech recognizer 504. Speech recognizer 504 is interfaced to bus 492 allowing microphone 482 to provide input for control logic 130. Sound generator 506 supplies signals for audible reproduction to speaker 480 through speaker driver 502. Sound generator 506 may be capable of supplying tone-based signals and/or artificial speech signals. Sound generator 506 is interfaced to bus 492 allowing control logic 130 to send audible signals to a user.

Display controller 508 generates signals controlling display 474 and accepts display control input 476. Display controller 508 is interfaced to bus 492 allowing control logic 130 to initiate graphical output on display 474 and receive user input from controls 476.

Radio 510 is interfaced to bus 492 allowing control logic 130 to initiate display through radio 510 and receive input from controls on radio 510. For example, volume and tuning controls on radio 510 may be used to enter a fixed code value. Rotating the volume knob may sequentially cycle through the most significant bits of the code and rotating the tuning knob may sequentially cycle through the least significant bits of the code. Pushing a radio control can then send the fixed code to control logic 130.

Wireless transceiver 512 is interfaced to bus 492 through bus interface 494. Wireless transceiver 512 communicates with wireless communication devices, represented by 514 and 516, such as portable telephones, personal digital assistants, laptop computers, and the like, through infrared or short range radio frequency signals. Various standards exist for such communications including IEEE 802.11, Bluetooth, IrDA, and the like. Transceiver 512 is interfaced to bus 492, permitting wireless devices 514, 516 to provide input to and receive output from control logic 130. Wireless devices 514, 516 may also be used as a data port to upload code and scheme data into memory 496 and/or to exchange data with programmable control 30 for assisting in programming control 30.

Data port 518 implements a data connection interfaced to bus 492 through bus interface 494. Data port 518 provides a plug or other interface for exchanging digital information. One or more standards may be supported, such as IEEE 1394, RS-232, SCSI, USB, PCMCIA, and the like. Proprietary information exchange or vehicle diagnostic ports may also be supported. Data port 518 may be used to upload code and scheme data into memory 496 and/or exchange data with programmable control 30 for assisting in programming control 30.

Figure 19:
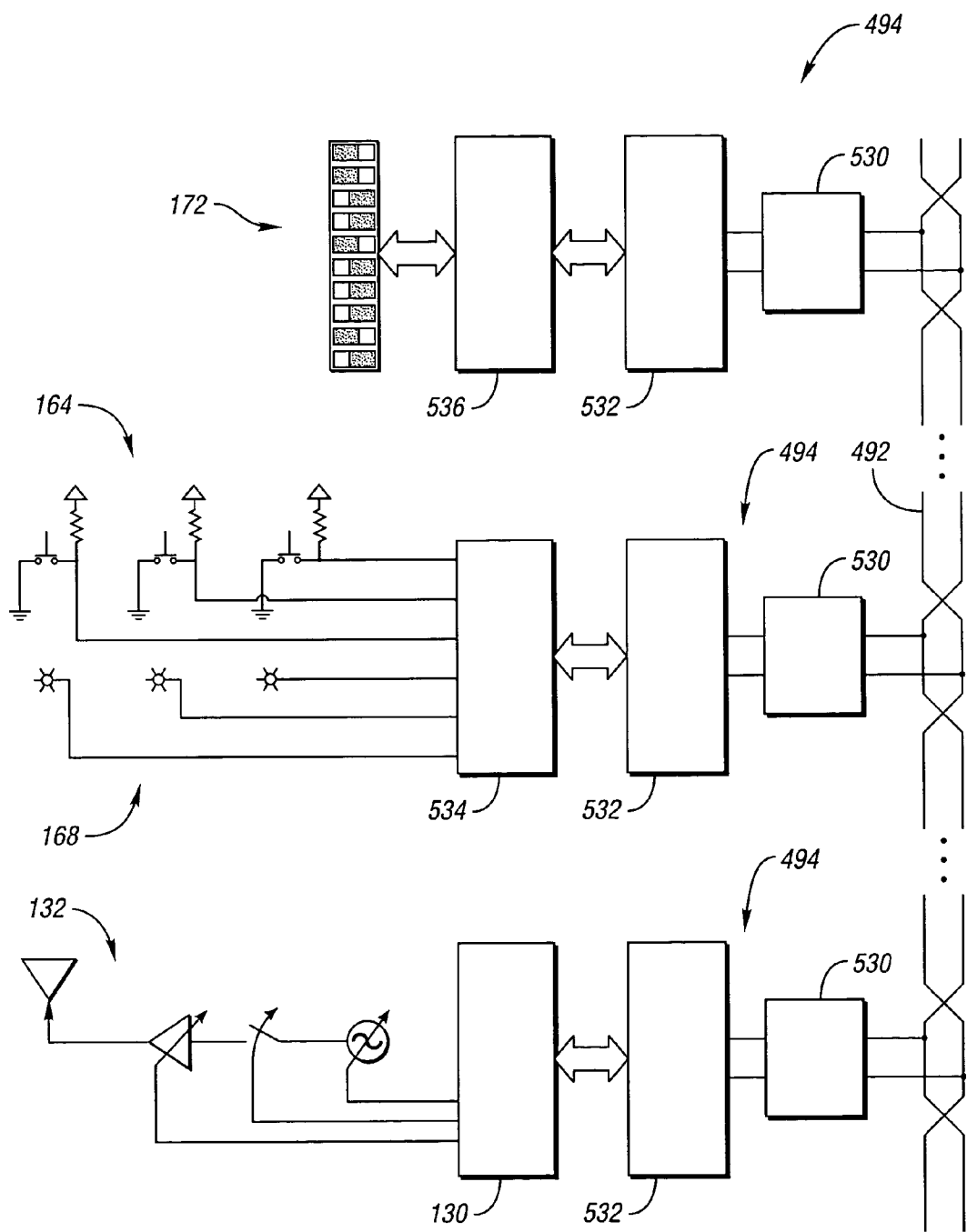
FIG. 19 is a block diagram illustrating distributed control elements interconnected by a vehicle bus according to an embodiment of the present invention.

Referring now to FIG. 19, a block diagram illustrating distributed control elements interconnected by a vehicle bus according to an embodiment of the present invention is shown. Bus 492 is a CAN bus. Bus interface 494 may be implemented with CAN transceiver 530 and CAN controller 532. CAN transceiver 530 may be a PCA82C250 transceiver from Philips Semiconductors. CAN controller 232 may be a SJA 1000 controller from Philips Semiconductors. CAN controller 232 is designed to connect directly with data, address and control pins of certain microcontrollers such as, for example, an 80C51 family microcontroller from Intel Corporation.

In the example shown, control logic 130 and transmitter 132 are supported by a first bus interface 494. Activation inputs 164 provide inputs to, and indicators 168 are driven by, microcontroller 534 which is supported by a second bus interface 494. Programming input switches 172 are connected in parallel to microcontroller 536 which is supported by a third bus interface 494. Serial bus 492 and separate interfaces 494 permit various components of programmable control 30 to be placed in different locations within vehicle 32. One advantage of separate location is that transmitter 132 need not be placed near user controls 164, 168, 172. Instead, transmitter 132 may be placed at a location optimizing radio frequency transmission from vehicle 32. Another advantage of separately locating components of programmable control 30 is to facilitate the design of vehicle interior 470. For example, activation inputs 164 and indicator lamps 168 may be located for easy user access such as in an overhead console, a visor, a headliner, and the like. Programming input controls 172, which would be infrequently used, may be placed in a more hidden location such as inside of a glove box, trunk, storage compartment, and the like. Yet another advantage of a bus-based programmable control 30 is the ability to interface control logic 130 with a wide variety of vehicle controls and displays.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for wirelessly activating an appliance, the appliance responding to one of a plurality of transmission schemes, the system comprising:
    a transmitter operative to transmit a radio frequency activation signal based on any of the plurality of transmission schemes;
    a plurality of activation input, each activation input identifying a wireless channel; each of the plurality of activation inputs comprising a switch;
    a user programming input including the same plurality of switches as the plurality of activation inputs;
    memory holding data describing a plurality of rolling code transmission schemes and a plurality of fixed code transmission schemes; and
    control logic in communication with the transmitter, the plurality of activation inputs, the user programming input and the memory, the control logic implementing a rolling code programming mode, a fixed code programming mode and an operating mode;
    the control logic in rolling code programming mode generating and transmitting a sequence of rolling code activation signals, each rolling code activation signal in the sequence of rolling code activation signals based on a different one of the plurality of rolling code transmission schemes, until user input indicates a successful rolling code transmission scheme, the control logic storing data specifying the successful rolling code transmission scheme associated with one of the at least one activation inputs;
    the control logic in fixed code programming mode receiving a fixed code from the user programming input then generating and transmitting a sequence of fixed code activation signals, each fixed code activation signal in the sequence of fixed code activation signals based on one of the plurality of fixed code transmission schemes and each transmitting the received fixed code, until user input indicates a successful fixed code transmission scheme, the control logic storing the fixed code and data specifying the successful fixed code transmission scheme associated with one of the at least one activation inputs;
    the control logic in operating mode receiving an activation input, retrieving data associated with the received activation input, and transmitting an activation signal based on the retrieved data.

2. The system of claim 1 wherein the fixed code is parallelly received.

3. The system of claim 1 wherein the fixed code is serially received.

4. The system of claim 1 wherein the control logic pauses for user input after transmission of at least one fixed code activation signal in the sequence of fixed code activation signals.

5. The system of claim 1 wherein the control logic pauses for user input after transmission of at least one rolling code activation signal in the sequence of rolling code activation signals.

6. The system of claim 1 wherein membership in the transmitted sequence of fixed code signals is based on the number of bits in the received fixed code.

7. The system of claim 1 wherein the sequence of fixed code signals comprises at least one pair of fixed code activation signals based on the same fixed code transmission scheme, one fixed code activation signal in each pair based on a reversal of the fixed code.

8. The system of claim 1 wherein the sequence of fixed code signals comprises at least one pair of fixed code activation signals based on the same fixed code transmission scheme, one fixed code activation signal in each pair based on an inverse of the fixed code.

9. The system of claim 1 wherein at least one of the sequence of fixed code signals and the sequence of rolling code signals is ordered based on a popularity of schemes, thereby reducing an average latency time until user input indicates a successful scheme.

10. The system of claim 1 further comprising a data port for receiving the data describing the plurality of rolling code transmission schemes and the plurality of fixed code transmission schemes.

11. The system of claim 1 further comprising means for modifying the data describing the plurality of rolling code transmission schemes and the plurality of fixed code transmission schemes.

12. The system of claim 1 further comprising a vehicle bus in communication with the control logic.

13. A method of activating an appliance, the appliance controlled by a radio frequency activation signal, the method comprising: if a user indicates that the appliance is activated by a rolling code activation signal, transmitting a sequence of different rolling code activation signals until the user indicates a successful rolling code transmission, then storing data representing a rolling code scheme used to generate the successful rolling code transmission associated with one of a plurality of activation inputs;
    if the user indicates that the appliance is activated by a fixed code activation signal, receiving a fixed code word input by the user and using the a fixed code word to generate and transmit each of a sequence of different fixed code activation signals until the user indicates a successful fixed code transmission, then storing data representing the fixed code word and a fixed code scheme used to generate the successful fixed code transmission associated with one of the plurality of activation inputs; and in response to an activation of one of the plurality of activation inputs, generating and transmitting an activation signal based on stored data.

14. The method of claim 13 further comprising receiving the fixed code word serially input by the user.

15. The method of claim 13 further comprising receiving the fixed code word parallelly input by the user.

16. The method of claim 13 further comprising determining which of a plurality of fixed code transmission schemes will be used in the sequence of different fixed code activation signals based on a number of bits in the fixed code word.

17. The method of claim 13 wherein the sequence of different fixed code activation signals comprises a first signal and a second signal, the second signal based on the same fixed code scheme as the first signal and on a reversal of the fixed code word.

18. The method of claim 13 wherein the sequence of different fixed code activation signals comprises a first signal and a second signal, the second signal based on the same fixed code scheme as the first signal and on an inversion of the fixed code word.

19. The method of claim 13 wherein at least one of the sequence of different fixed code activation signals and the sequence of different rolling code activation signals is ordered based on a popularity of schemes.

20. The method of claim 13 wherein the sequence of different fixed code activation signals and the sequence of rolling code activation signals are based on data held in memory, the method further comprising modifying the data.

21. A method of programming a programmable remote control, the remote control programmable to one of a plurality of appliance activation schemes, the method comprising:

receiving data specifying characteristics of at least one of the plurality of appliance activation schemes over a vehicle bus;

receiving user type input specifying activation signal type;

if the user type input specifies variable code type, transmitting variable code activation signals until receiving user success input indicating a target appliance has been activated;

if the user type input specifies fixed code type, receiving user fixed code input providing a fixed code and transmitting fixed code activation signals until receiving user success input indicating the target appliance has been activated; and storing information specifying an activation signal for activating the target appliance based on the received user success input.

22. A system for wirelessly activating an appliance, the appliance responding to one of a plurality of transmission schemes, the system comprising:

a radio frequency transmitter;

memory holding data describing the plurality of transmission schemes; and control logic in communication with the transmitter and the memory, the control logic operative to (a) store a fixed code, (b) if a fixed code is stored, transmit a sequence of fixed code activation schemes, based on the fixed code and data held in the memory, until input indicating activation of the appliance is received, (c) if no fixed code is stored, transmit a sequence of rolling code activation schemes, based on data held in the memory, until input indicating activation of the appliance is received, (d) store an indication as to which activation scheme activated the appliance based on the received input indicating activation of the appliance, (e) generate an activation signal based on the stored indication and a received activation input, and (f) receive the data describing the plurality of transmission schemes and store the received data in the memory.

* * * * *

UNITED STATES PATENT AND TRADEMARK OFFICE
CERTIFICATE OF CORRECTION

PATENT NO. : 7,039,397 B2  Page 1 of 1
APPLICATION NO. : 10/630390
DATED : May 2, 2006
INVENTOR(S) : Mark D. Chuey It is certified that error appears in the above-identified patent and that said Letters Patent is hereby corrected as shown below:

Column 16, Line 60, Claim 13:
After "the" delete "a".

Column 17, Line 40, Claim 21:
After "signals" insert – using different appliance activation schemes –.

Column 18, Line 3, Claim 21:
After "signals" insert – using different appliance activation schemes –.

Signed and Sealed this

Fifteenth Day of August, 2006

JON W. DUDAS
*Director of the United States Patent and Trademark Office*